(12) United States Patent
Hutson et al.

(10) Patent No.: US 10,576,622 B2
(45) Date of Patent: Mar. 3, 2020

(54) ROBOTIC MANIPULATOR

(71) Applicant: QUALCOMM Incorporated, San Diego, CA (US)

(72) Inventors: Donald Bolden Hutson, San Diego, CA (US); Saura Naderi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 252 days.

(21) Appl. No.: 15/679,010

(22) Filed: Aug. 16, 2017

(65) Prior Publication Data

US 2018/0304457 A1 Oct. 25, 2018

Related U.S. Application Data

(60) Provisional application No. 62/488,657, filed on Apr. 21, 2017.

(51) Int. Cl.
| | |
|---|---|
| B25J 17/00 | (2006.01) |
| B25J 17/02 | (2006.01) |
| B25J 18/00 | (2006.01) |
| B25J 9/06 | (2006.01) |
| B25J 19/00 | (2006.01) |
| B25J 9/10 | (2006.01) |

(52) U.S. Cl.
CPC ............... *B25J 9/065* (2013.01); *B25J 9/06* (2013.01); *B25J 9/102* (2013.01); *B25J 17/0258* (2013.01); *B25J 17/0283* (2013.01); *B25J 18/005* (2013.01); *B25J 19/0016* (2013.01)

(58) Field of Classification Search
CPC ... B25J 18/005; B25J 19/0016; B25J 19/0025
See application file for complete search history.

(56) References Cited

U.S. PATENT DOCUMENTS

| 4,708,578 A | 11/1987 | Richter | |
|---|---|---|---|
| 6,451,027 B1 * | 9/2002 | Cooper | A61B 1/00149 |
| | | | 606/130 |

(Continued)

FOREIGN PATENT DOCUMENTS

| EP | 3017782 A2 | 5/2016 |
|---|---|---|
| JP | 2005161572 A | 6/2005 |

OTHER PUBLICATIONS

Biorobotics: "Trunk Snake Robot", The Robotics Institute, Retrieved from Internet on Mar. 30, 2017, file:///Users/sheilaclayton/Desktop/Trunk%20Snake%20-%20Biorobotics.webarchive, pp. 1-4.

(Continued)

*Primary Examiner* — Jake Cook
(74) *Attorney, Agent, or Firm* — Holland & Hart LLP

(57) ABSTRACT

Systems, apparatuses, and methods for a robotic manipulator that includes a base, a first segment, a first joint operatively coupling the base and the first segment, a second segment, and a second joint operatively coupling the first segment and the second segment are provided. The first joint is configured to rotate the first segment about at least two axes of rotation with respect to the base. The second joint is configured to rotate the second segment about at least one axis of rotation with respect to the first segment.

26 Claims, 15 Drawing Sheets

(56) References Cited

U.S. PATENT DOCUMENTS

| | | | |
|---|---|---|---|
| 2010/0319164 A1* | 12/2010 | Bax | B25J 19/0016 |
| | | | 16/401 |
| 2012/0253513 A1 | 10/2012 | Unsworth | |
| 2014/0090506 A1 | 4/2014 | Tobey | |
| 2015/0250546 A1 | 9/2015 | Larkin et al. | |

OTHER PUBLICATIONS

Shammas E., et al., "New Joint Design for Three-dimensional Hyper Redundant Robots", IEEE/RSJ International Conference on Intelligent Robots and Systems (IROS), 2003, pp. 3594-3599.

International Search Report and Written Opinion—PCT/US2018/018857—ISA/EPO—dated Sep. 19, 2018.

Hagn U., et al., "The DLR MIRO: a Versatile Lightweight Robot for Surgical Applications", Industrial Robot: an International Journal, vol. 35, No. 4, Jun. 20, 2008, pp. 324-336, XP055475149, Bradford, ISSN: 0143-991X, DOI: 10.1108/01439910810876427.

Konietschke R., et al., "Kinematic Design Optimization of an Actuated Carrier for the DLR Multi-Arm Surgical System", 2006 IEEE/RSJ International Conference on Intelligent Robots and Systems, IEEE, PI, Oct. 1, 2006, pp. 4381-4387, XP031006813, ISBN: 978-1-4244-0258-8.

Partial International Search Report—PCT/US2018/018857—ISA/EPO—dated Jun. 6, 2018.

* cited by examiner

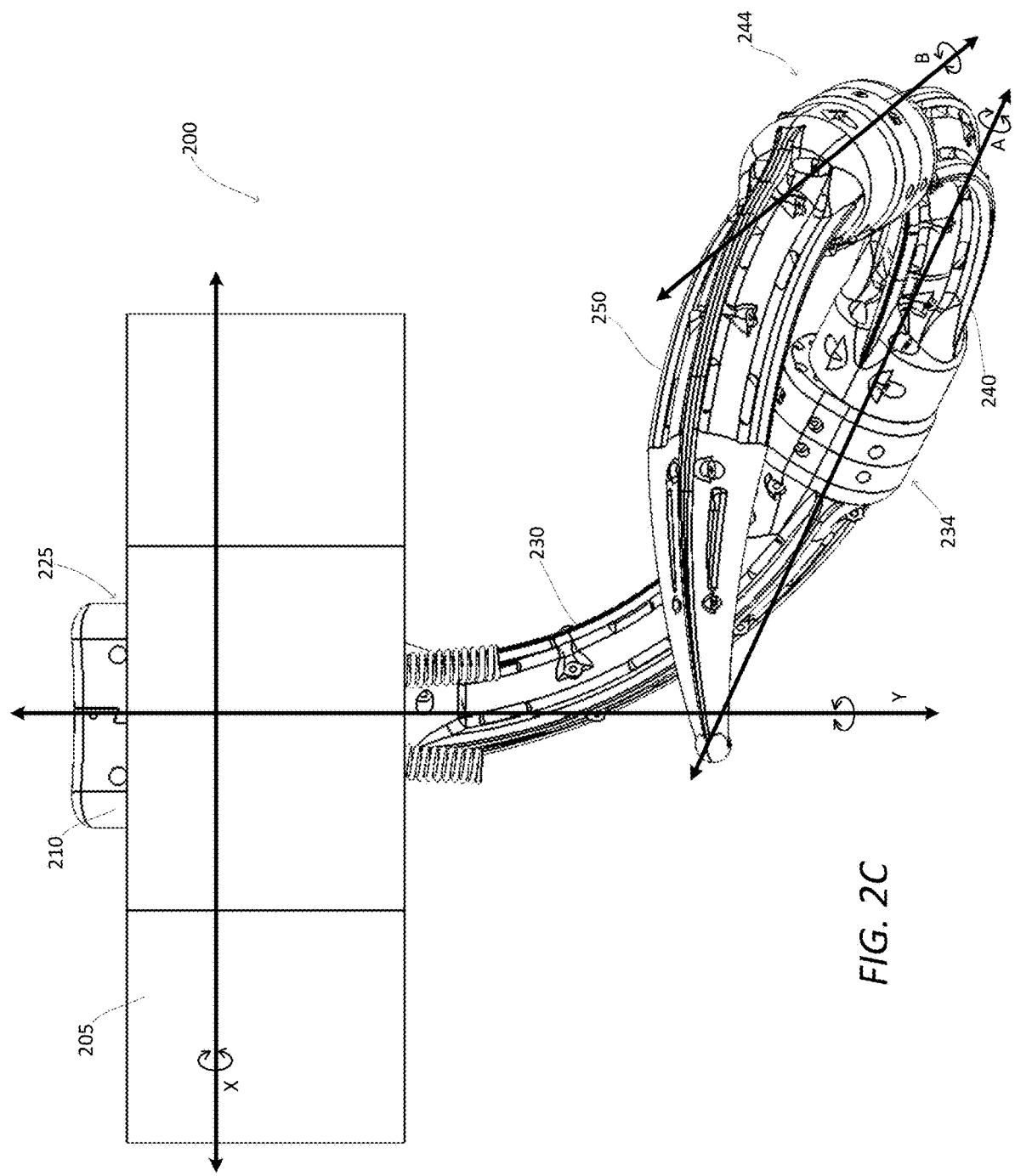

ROBOTIC MANIPULATOR

CROSS-REFERENCE TO RELATED PATENT APPLICATION

This application claims priority from Provisional U.S. application No. 62/488,657, filed Apr. 21, 2017, which is incorporated herein by reference in its entirety.

BACKGROUND

A traditional robotic manipulator uses one or more 90-degree joints (in elbow-like arrangements) for various tasks, including but are not limited to, manipulating objects, data gathering, locomotion, flight, structural support, and the like. Such configurations consume a considerable amount of torque about each joint, thus requiring a considerable amount of mechanical energy to operate. In addition, a 90-degree joint can easily crush objects or pinch clothing at the joint.

SUMMARY

In some implementations, a robotic manipulator, includes a base, a first segment, a first joint operatively coupling the base and the first segment. The first joint is configured to rotate the first segment about at least two axes of rotation with respect to the base. The robotic manipulator further includes a second segment and a second joint operatively coupling the first segment and the second segment, wherein the second joint is configured to rotate the second segment about at least one axis of rotation with respect to the first segment. At least one of the first segment or the second segment has a curved shape.

In some implementations, the at least one of the first segment or the second segment is rigid and curved along a length dimension.

In some implementations, each of the first segment and the second segment is rigid and curved along a length dimension.

In some implementations, the at least one of the first segment or the second segment includes a hollow cylindrical structure that has the curved shape.

In some implementations, the first joint includes a 3-gear differential to rotate the first segment about the at least two axes of rotation with respect to the base.

In some implementations, the 3-gear differential include a first gear, a second gear, and a third gear. The first gear and the second gear have a same size.

In some implementations, the first gear is configured such that a tooth-bearing face of the first gear faces a tooth-bearing face of the second gear. A shaft of the first gear and a shaft of the second gear are coaxial. The third gear is operatively coupled to the first segment. The third gear has teeth meshed with teeth of the first gear and the second gear such that movement of the first gear and the second gear translates to movement of the first segment.

In some implementations, the first gear and the second gear are driven by separate first motors. Each of the separate first motors is a multi-turn rotational servo configured for continuous rotation.

In some implementations, each of the first gear, the second gear, and the third gear is a bevel gear. The first gear and the second gear rotating in a same direction with a same angular speed causes the first segment to rotate in the same direction with the same angular speed. The first gear and the second gear rotating in at least one of different directions or different angular speeds causes the first segment to rotate about a shaft of the third gear.

In some implementations, the base further includes a support element operatively coupled to the first joint is configured to provide a reactionary force opposite to a direction of motion of the first segment.

In some implementations, the support element includes a spring-loaded device to provide mechanical force to bias the first segment in one rotational direction about one of the at least two axes of rotation about the first joint.

In some implementations, the support element includes at least a spring operatively coupled to at least one progressive eccentric lobe fixed to a mount that rotates with the first segment in one of the at least two axes of rotation. The spring is configured to compress or extend in response to the motion of the first segment to store mechanical energy corresponding to the reactionary force.

In some implementations, the second joint includes a second motor configured to rotate the second segment about the at least one axis of rotation with respect to the first segment. The second motor is a multi-turn rotational servo.

In some implementations, the second joint includes a hollow bore through which at least one wire is passed. The at least one wire is passed through the first segment.

In some implementations, the second motor drives a gear that is offset from a center of a cross-section of the first segment, leaving space for at least one of an arm connection structure or an opening to pass wires through the second joint.

In some implementations, the gear driven by the second motor engages teeth arranged on an internal surface of the second segment to rotate the second segment with respect to the first segment.

In some implementations, the first joint and the second joint are continuous rotation joints.

In some implementations, the base is configured to be operatively coupled to an attachment point or an interface.

In some implementations, the first joint is supported by the base. The first joint includes a hollow bore through which at least one wire is passed.

In some implementations, the robotic manipulator further includes at least one additional segment linkage assembly. Each of the at least one additional segment linkage assembly includes an additional segment linked to another segment of the robotic manipulator through an additional joint. The additional joint is configured to rotate the additional segment about at least one axis of rotation with respect to the another segment.

In some implementations, the additional segment in each of the at least one additional segment linkage assembly has a curved shape.

In some implementations, the robotic manipulator further includes a processing circuit configured to control rotation at the first joint and the second joint.

In some implementations, the first joint and the second joint are driven by separate motors controlled by the processing circuit.

In some implementations, one of the first segment or the second segment comprises a commutator. The second joint comprises an offset mounted gear that is mounted at a position offset from a center of a cross-section of one or more of the first segment or the second segment. The offset mounted gear leaves space for at least one of an arm connection structure or an opening to pass at least one wire through the second joint.

In some implementations, the space left by the offset mounted gear and the commutator are configured to prevent the at least one wire from entangling or damage as the first segment and the second segment rotate about an axis relative to one another.

In some implementations, a method of providing a robotic manipulator includes providing a base, providing a first segment, providing a first joint operatively coupling the base and the first segment, wherein the first joint is configured to rotate the first segment about at least two axes of rotation with respect to the base, providing a second segment, and providing a second joint operatively coupling the first segment and the second segment, wherein the second joint is configured to rotate the second segment about at least one axis of rotation with respect to the first segment. At least one of the first segment or the second segment has a curved shape.

In some implementations, a robotic manipulator includes a base means, a first segment means, a first joint means operatively coupling the base means and the first segment means, wherein the first joint means is configured to rotate the first segment means about at least two axes of rotation with respect to the base means, a second segment means, and a second joint means operatively coupling the first segment means and the second segment means, wherein the second joint means is configured to rotate the second segment means about at least one axis of rotation with respect to the first segment means. At least one of the first segment means or the second segment means has a curved shape.

BRIEF DESCRIPTION OF THE DRAWINGS

FIG. 2C shows a back view of a robotic manipulator according to some implementations.

DETAILED DESCRIPTION

Implementations relate to apparatus, systems, and methods for robotic arms or manipulators. Particular implementations relate to a robotic arm or manipulator having a first joint that generates rotational movement about at least two axes of rotation, a second joint that generates rotational movement about at least one axis of rotation, and multiple segments (arms) joined by the first joint and the second joint. At least one of the segments may be rigid and have a curved shape to improve a work envelope of the robotic arm or manipulator as the segments are being rotated at the first and/or second joints. Additional segments and joints can be implemented in a similar fashion to further improve the work envelope of the robotic manipulator. Passive support elements (e.g., springs, rubber, strings, and/or the like) may be used at a base of the robotic manipulator to generate a reactionary force opposite to a direction of motion of the first segment (as moved by the first joint) about the base, to facilitate the first joint in moving the first segment (as well as other segments linked therewith) back into a previous position. Furthermore, the second joint that rotates the second segment and the first segment relative to one another may include an off-center gear that is offset from a center of a cross-section of the first/second segment to allow at least a wire (carrying power and/or control signals) to pass through an unoccupied space of the cross-section.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Figure 1A:
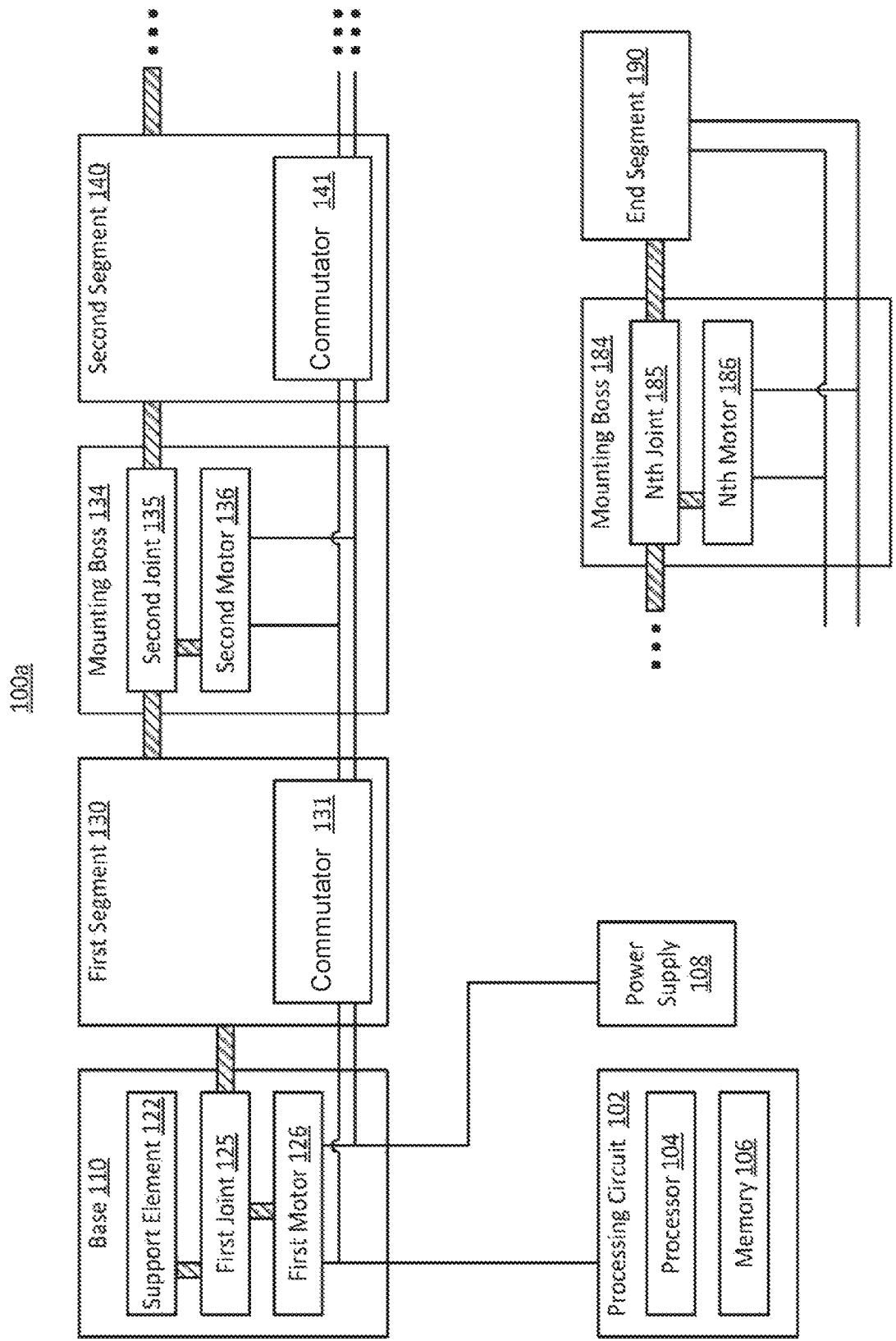
FIG. 1A is a schematic block diagram illustrating a robotic manipulator according to some implementations.

FIG. 1A is a schematic block diagram illustrating a robotic manipulator 100a according to some implementations. Referring to FIG. 1A, the robotic manipulator 100a may include at least a base 110 operatively coupled to a first segment 130. The first segment 130 may be linked to a second segment 140 via a mounting boss 134. The second segment 140 may be linked to at least one additional segment linkage assembly. Each additional segment linkage assembly may include at least one additional segment. Each of the at least one additional segment may be the same as or at least similar to the first segment 130, the second segment 140, or the like. The at least one additional segment may be operatively coupled to at least one additional mounting boss of each additional segment linkage assembly. Each of the at least one additional mounting boss may be the same as or at least similar to the mounting boss 134 or the like. The additional mounting boss may link the additional segment to another segment of the robotic manipulator 100a in a manner similar to described with respect to the mounting boss 134 or a mounting boss 184. As shown in the non-limiting example of FIG. 1A, the mounting boss 184 may couple an additional segment (omitted for clarity) to an end segment 190. In some implementations in which no additional segment linkage assemblies are provided, the mounting boss 184 may couple the end segment 190 to the second segment 140. In some implementations in which the second segment 140, the mounting boss 134, and additional segment linkage assemblies are not provided, the mounting boss 184 may couple the end segment 190 to the first segment 130.

The base 110 may serve as a point of attachment for the rest of the robotic manipulator 100a, connecting the rest of the robotic manipulator 100a to an attachment point or interface to which the robotic manipulator 100a may be affixed or otherwise coupled. In some implementations, the base 110 may be configured as or may be coupled to the floor (or other surface), a movable platform, a robotic base (e.g., a drone or robot), a human operator, and/or the like.

Illustrating with a non-limiting example, the base 110 may allow the robotic manipulator 100a to be affixed or otherwise coupled to various surfaces in factories, assembly lines, workshops, hospitals, warehouse, parking garage, schools, and/or other suitable environments. The base 110 may attach or otherwise couple the robotic manipulator 100a to a generally stationary or on a movable platform that can move the robotic manipulator 100a to a desired location, so that the robot manipulator 110a can function as described herein. The robotic manipulator 110a can support manipulating objects in the manner described.

Illustrating with another non-limiting example, the base 110 may be configured as or may be coupled to a mobile platform such as, but not limited to, a drone or robot. The drone or robot may be aerial, terrestrial, aquatic, spaceborne, and/or the like. In such instances, the robotic manipulator 100a can be used to manipulate objects in a manner consistent with advantages described herein, including but not limited to, the versatile and smaller working envelope, less torque constraint, and/or the like. The work envelope refers to a working space (e.g., a volume) in which the robotic manipulator 100a can move and perform various tasks described herein. Thus, the robotic manipulator 100a described herein can allow improved movement in a smaller working area than conventional robotic arms, which have to extend further for movement and/or repositioning. Due to the robotic manipulator 100a can work within a more confined space, one or more robotic manipulators (such as but not limited to, the robotic manipulator 100a) can be placed closer to each other (as compared to conventional arms) without colliding with each other or other objects, such as but not limited to humans.

The shapes and configurations of the robotic manipulator 100a not only allow manipulating objects, but also support the drone or robot in any desired orientation or position (e.g., in an upright orientation) due to load-bearing capabilities. In some implementations, the drone or robot may use one or more (often a plurality of) robotic manipulators such as the robotic manipulator 100a as landing gears or skids. In some implementations, the drone or robot may use one or more (often a plurality of) robotic manipulators such as the robotic manipulator 100a for propulsion (e.g., walking, flying, swimming, and/or the like). In some instances, a drone may have any number of arms such as, but not limited to, the robotic manipulator 100a to support the drone to walk on the ground (e.g., in a crab-like or octopus-like manner). Due to such functionalities, arms such as the robotic manipulator 100a can facilitate motion through two or more mediums (e.g., two or more of land, water, air, space, and the like) simultaneously. One such example may be amphibious locomotion.

In some implementations, a drone may include any number of arms with different functionalities. For example, a drone may have at least one first arm such as the robotic manipulator 110a to orient and/or position the drone and/or at least one second arm for manipulating objects. The drone may alternatively or additionally include at least one third arm for locomotion. Illustrating with a non-limiting example involving a six-armed drone, each arm of the drone may be an arm similar to the robotic manipulator 100a. The drone can land on any number or all of the arms (e.g., at least 3 arms for a tripod stance). Some arms configured for landing or some free arms can be configured to pick up objects individually or in cooperation with each other. For instance, four rear arms can prop up the drone while two front arms engage a cargo item (e.g., pinning the item between the tips of the arms or in any other manners for picking up or interacting with that item). Furthermore, the drone can then take off via one or more of the arms.

Illustrating with a non-limiting example, the robotic manipulator 100a may include an interface (e.g., a wearable belt, backpack, saddle, seat, wheelchair, clothing, headwear, prosthetic limb, or the like) that can link the robotic manipulator 100a with the human operator or machine base. The base 110 and/or the interface may include attach/detach features (e.g., Velcro, quick release base, buckle, clamp, magnets, or the like) that allow attachment to and detachment from one another. Accordingly, the human operator or the machine base can conveniently wear or support and control the robotic manipulator 100a as needed.

The base 110 may include a first joint 125 that is mechanically coupled to the first segment 130. The first joint 125 may be mechanically driven by at least one first motor 126 to move (rotate) the first segment 130 in at least two axes with respect to the base 110. The at least one first motor 126 may cause the first joint 125 to rotate the first segment 130 in at least two axes of rotation with respect to the base 110. The first motor 126 may be controlled by a processing circuit 102 and powered by a power supply 108. The processing circuit 102 and the power supply 108 may be operatively connected to the first motor 126 through one or more wires. Each of the processing circuit 102 and the power supply 108 may be supported by the base 110, by the interface, by another component of the robotic manipulator 100a, or by a suitable structure associated with the human operator or robotic base.

The processing circuit 102 may include a processor 104 and memory 106. The processor 104 may be implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 106 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 106 includes tangible, non-transient volatile memory, or non-volatile memory. In this regard, the memory 106 stores programming logic that, when executed by the processor 104, controls the operations of robotic manipulator 100a.

For instance, the processing circuit 102 may be configured to control motors (e.g., the at least one first motor 126, a second motor 136, . . . , Nth motor 186, and/or the like) that drive the joints (e.g., the first joint 125, second joint 135, . . . , Nth joint 185, and/or the like) to move any part of the robotic manipulator 100*a* (e.g., the first segment 130, second segment 140, . . . , end segment 190, and/or the like) into a given position, and/or orientation. Therefore, the joints 125, 135, . . . , 185 on the robotic manipulator 110*a* may be centrally controlled by the processing circuit 102. Each of the joints 125, 135, . . . , 185 on the robotic manipulator 110*a* may be driven by a separate motor controlled by the processing circuit 102. In other implementations, a same motor can drive more joints through a suitable mechanical linkage or in any other suitable manner. Each of the joints 125, 135, . . . , 185 may be a continuous rotation joint.

In various implementations, the processing circuit 102 may control various functions of the segments 130, 140, . . . , 190. Such functions include but not limited to object engagement (e.g., picking up an object), data gathering, locomotion, flight, structural support, and/or other suitable purposes. Illustrating with a non-limiting example, the processing circuit 102 may control articulating fingers, manipulators, clamps, magnets, nets, and/or the like arranged on one or more of the segments 130, 140 . . . , 190 to engage an object. Illustrating with another non-limiting example, the processing circuit 102 may control sensors (e.g., camera, microphone, accelerometers, inertia sensor, pressure sensor, motion sensor, radar, and/or the like) arranged on one or more of the segments 130, 140 . . . , 190 to capture sensor data. Illustrating with yet another non-limiting example, the processing circuit 102 may control legs, wheels, treads, propellers, rudders, flaps, ailerons, other propulsion, steering or control devices, and/or the like arranged on one or more of the segments 130, 140 . . . , 190. In a further non-limiting example, the processing circuit 102 may control weapons, lasers, or other tools arranged on one or more of the segments 130, 140 . . . , 190.

The power supply 108 may include any suitable power source for powering the motors (e.g., the at least one first motor 126, a second motor 136, . . . , Nth motor 186, and/or the like) and any sensors or tools arranged on the robotic manipulator 100*a*. The power supply 108 may include one or more of batteries (e.g., lithium-polymer batteries), solar panels/cells, hydrogen cells, tethered power connections, combustion engines, power links (e.g., laser transmitter), or the like.

Wires carrying command signals from the processing circuit 102 and/or power from the power supply 108 may be passed through the base 110 and any portion of the robotic manipulator 100*a* (e.g., through the first segment 130, mounting boss 134, second segment 140, . . . , the mounting boss 184, and the end segment 190). As described in detail herein, the base 110 and the mounting bosses 134, . . . , 184 may include hollow bores or holes through which the wires can be passed without entanglement or damage to the wires. Interiors of the segments 130, 140, . . . , and 190 may include openings, channels, grooves, holes, and/or the like through which the wires can be passed.

Furthermore, one or more of the segments (e.g., the first segment 130, the second segment 140, or the like) may include a commutator (e.g., commutator 131, commutator 141, or the like) to prevent the wires from entangling and harm by allowing unrestricted rotation (i.e., continuous rotation) of the wires, as base 110 and the segments 130, 140, . . . , 190 move (rotate) relative to one another. The commutators 131, 141, or the like may be arranged within an interior volume of the first segment 130, the second segment 140, or the like in some implementations. In other implementations, the commutators 131, 141, or the like may be attached to or supported by the respective one of the first segment 130, the second segment 140, or the like in other suitable manners. Implementations of the commutator 131, commutator 141, or the like may include hydraulic commutators, pneumatic commutators, electrical commutators, and the like.

The base 110 may include a support element 122 mechanically coupled to the first joint 125. In some implementations, the support element 122 may generate a reactionary force opposite to a direction of motion of the first segment 130 (as moved by the first joint 125), moving from a first position to a second position. The reactionary force can facilitate the first joint 125 in moving the first segment 130 (as well as the rest of the robotic manipulator 100*a*, including other segments 140, . . . , 190 linked therewith) back into the first position. Illustrating with a non-limiting example in which the first joint 125 moves the first segment 130 toward an object in a direction to retrieve the object, the support element 122 (e.g., a passive support element such as a spring) may accumulate or otherwise generate potential energy corresponding to moving the first segment 130 in an opposite direction. Upon the processing circuit 102 determining that the object (not shown) has been engaged (e.g., grasped), the processing circuit 102 may control the first joint 125 to move the first segment 130 in the opposite direction (e.g., toward the base 110) to retrieve the object (not shown). The movement in the opposite direction may be facilitated by releasing the potential energy stored in the support element 122. In other words, both the support element 122 and the first motor 126 may simultaneously apply force to the first segment 130 in the opposite direction.

Therefore, due to the facilitation by the support element 122, the first motor 126 can apply comparatively less force to the first joint 125 and the first segment 130 even with added weight of the object. In some implementations, the support element 122 may be a passive element or bias member such as, but not limited to, a spring, rubber, a string, and/or the like. Comparing to additional active elements such as the motors 126, 136, . . . , 186, the support element 122 may be light-weight, thus reducing the overall weight of the robotic manipulator 100*a*. In other implementations, the support element 122 may be active support elements such as, but not limited to, additional motors operatively coupled to the first joint 125 and/or the first segment 130.

The segments 130, 140, . . . , 190 (including additional segments, if any) may be made from any suitable material, such as, but not limited to, plastic, wood, metal, metal alloy, composite, or the like. At least one of the segments 130, 140, . . . , 190 (including additional segments, if any) may have a curved shape. In some implementations, all of the segments on the robotic manipulator 100*a* may have curved shapes. The combination of the joints 125, 135, . . . , 185 and the curved shapes of one or more of the segments 130, 140, . . . , 190 allow improved flexibility and work envelope for the robotic manipulator 100*a*, thus improving the working space. Suitable shapes of the segments 130, 140, . . . , 190 may include, but not limited to, cylinders, hexagonal prisms, cuboids, or the like.

Each mounting boss (e.g., the mounting boss 134, . . . , and the mounting boss 184) may link two adjacent segments (e.g., the first segment 130, the second segment 140, . . . , and the end segment 190). For example, the mounting boss 134 may operatively (e.g., mechanically and electrically) couple the first segment 130 with the second segment 140. The mounting boss 134 may include the second joint 135 for moving (e.g., rotating) the second segment 140 relative to the first segment 130 or moving (e.g., rotating) the first segment 130 relative to the second segment 140, about at least one axis of rotation. As shown, the second motor 136 may receive command signals and power from the processing circuit 102 and the power supply 108, respectively. The second motor 136 may drive the second joint 135, which is mechanically coupled to the first segment 130 and the second segment 140, to rotate the first segment 130 or second segment 140 against one another, based on the command signals carried by at least one wire linked to the processing circuit 102. Each mounting boss (e.g., the mounting boss 134, . . . , and the mounting boss 184) may include, for example, a Teflon® bearing and/or a roller needle bearing to improve, for example, load at each mounting boss.

The mounting boss 184 may operatively (e.g., mechanically and electrically) couple an additional segment (not shown) with the end segment 190. The mounting boss 184 may include the Nth joint 185 for moving (e.g., rotating) the additional segment relative to the end segment 190 or moving (e.g., rotating) the end segment 190 relative to the additional segment, about at least one axis of rotation. As shown, the Nth motor 186 may receive command signals and power from the processing circuit 102 and the power supply 108, respectively. The Nth motor 186 may drive the Nth joint 185, which may be mechanically coupled to the additional segment and the end segment 190, to rotate the additional segment or end segment 190 against one another, based on the command signals carried by at least one wire linked to the processing circuit 102.

Figure 1B:
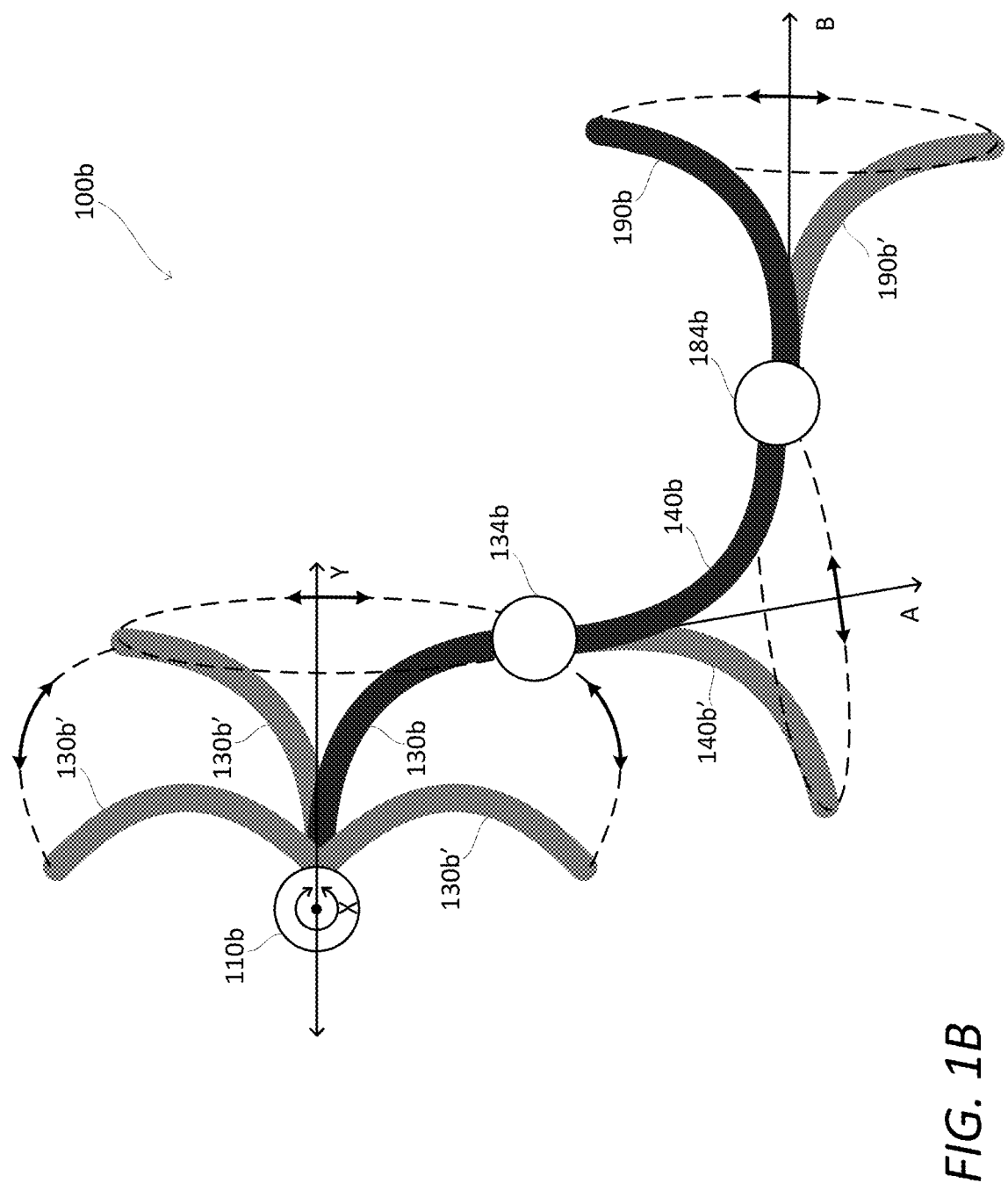
FIG. 1B is a schematic block diagram illustrating a work envelope of a robotic manipulator according to some implementations.

FIG. 1B is a schematic block diagram illustrating a work envelope of a robotic manipulator 100b according to some examples. Referring to FIGS. 1A-1B, the robotic manipulator 100b is shown to illustrate a range of motion of a part of the robotic manipulator 100b. For instance, a base 110b, a first segment 130b, a mounting boss 134b, a second segment 140b, a mounting boss 184b, and an end segment 190b may correspond to the base 110, the first segment 130, the mounting boss 134, the second segment 140, the mounting boss 184, and the end segment 190 of the robotic manipulator 100a, respectively. Additional arm segments and mounting bosses between the second segment 140 and the mounting boss 184 are omitted in the non-limiting example of the robotic manipulator 100b.

The first segment 130b, the second segment 140b, and the end segment 190b may each have a curved shape. The first segment 130b may extend from the base 110b to the mounting boss 134b, and is curved along a length dimension of the first segment 130b. The second segment 140b may extend away from the mounting boss 134b and is curved along a length dimension of the second segment 140b. The end segment 190b may extend from the mounting boss 184b, and is curved along a length dimension of the end segment 190b. The base 110b may cause the first segment 130b to rotate about two axes of rotation (e.g., X-axis and Y-axis) relative to the base 110b. As the first segment 130b rotates about the X-axis, the Y-axis may change accordingly. As shown, the first segment 130b may be placed in any position (130b, 130b', or anywhere therebetween) allowable by the rotation about the two axes of rotation. With respect to the second segment 140b (shown relative to the position of the first segment 130b for clarity), the mounting boss 134b may rotate the second segment 140b with respect to the first segment 130b (or vice versa) about A-axis. As shown, the second segment 140b may be placed in any position (140b, 140b', or anywhere therebetween) as a function of the rotation about the A-axis, and the rotation of any previous segments (e.g., the first segment 130b about the X-axis and Y-axis). With respect to the end segment 190b (shown relative to the position of the second segment 140b for clarity), the mounting boss 184b may rotate the end segment 190b with respect to the second segment 140b (or vice versa) about B-axis. As shown, the end segment 190b may be placed in any position (190b, 190b', or anywhere therebetween) as a function of the rotation about the B-axis, and the rotation of any previous segments (e.g., the first segment 130b about the X-axis and Y-axis, and the second segment 140b about the A-axis).

Therefore, the work envelope associated with the robotic manipulator 100b may be a function of the shape (e.g., the curvature) of segments (e.g., the first segment 130b, second segment 140b, and the end segment 190b) and the rotation about the joints (e.g., the base 110b, the mounting boss 134b, and the mounting boss 184b) that link the segments. Comparing to straight segments, irregularly shaped segments (e.g., the curved segments) allow improved flexibility and accuracy for any part of the robotic manipulator 100b to reach a particular desired position. Such advantages are especially emphasized for the end segment 190, 190b that can benefit from the curvature of all previous segments and the rotation of all previous joints.

Accordingly, examples described herein illustrate the robotic manipulator 100a or 100b having the base 110, 110b, the first segment 130, 130b, the first joint 125 linking the base 110a, 110b and the first segment 130, 130b, the second segment 140, 140b, and the second joint 135 linking the first segment 130, 130b and the second segment 140, 140b. The first joint 125 may be configured to rotate the first segment 130, 130b about two axes of rotation (e.g., the X-axis and the Y-axis) with respect to the base 110, 110b. The second joint 135 may be configured to rotate the second segment 140, 140b in at least one rotational axis (e.g., the A-axis) with respect to the first segment 130, 130b. The robotic manipulator 100a or 100b may further include the mounting boss 184, 184b and the end segment 190, 190b. The Nth joint 185 may be configured to rotate the end segment 190, 190b in at least one rotational axis (e.g., the B-axis) with respect to a previous segment (e.g., 140b). At least one of the first segment 130, 130b, the second segment 140, 140b, the end segment 190, 190b, or any segments therebetween not shown for clarity may have an irregular shape such as a curved shape. At least one of the first segment 130, 130b, the second segment 140, 140b, the end segment 190, 190b, or any segments therebetween not shown for clarity may be made from a rigid material.

The irregular and non-straight shape of one or more of the first segment 130, 130b, the second segment 140, 140b, the end segment 190, 190b, or any segments therebetween not shown for clarity, as well as the 2-axis rotation at the first joint 125 and the 1-axis rotation at the second joint 135 (as well as any subsequent joints) allow the robotic manipulator 100a, 100b to engage objects (e.g., to pick up an object at a different elevation relative to the base 110, 110b or to contact the ground for walking) with less torque than a 90-degree pivot elbow joint. While in the non-limiting examples shown herein, the segments 130b, 140b, 190b may have a curved shape, other examples of the segments 130, 140, . . . , 190 may have irregular, non-straight shapes that are not curved. Illustrating with a non-limiting example, each of one or more of the segments 130, 140, . . . , 190 may have a rigid, straight, and elongated shape with one or more angled turns (e.g., 30° turns, 40° turns, 60° turns, 90° turns, a combination thereof, and/or the like) instead of gradual curvature. The robotic manipulator 100a may include additional segments and joints.

Figure 2A:
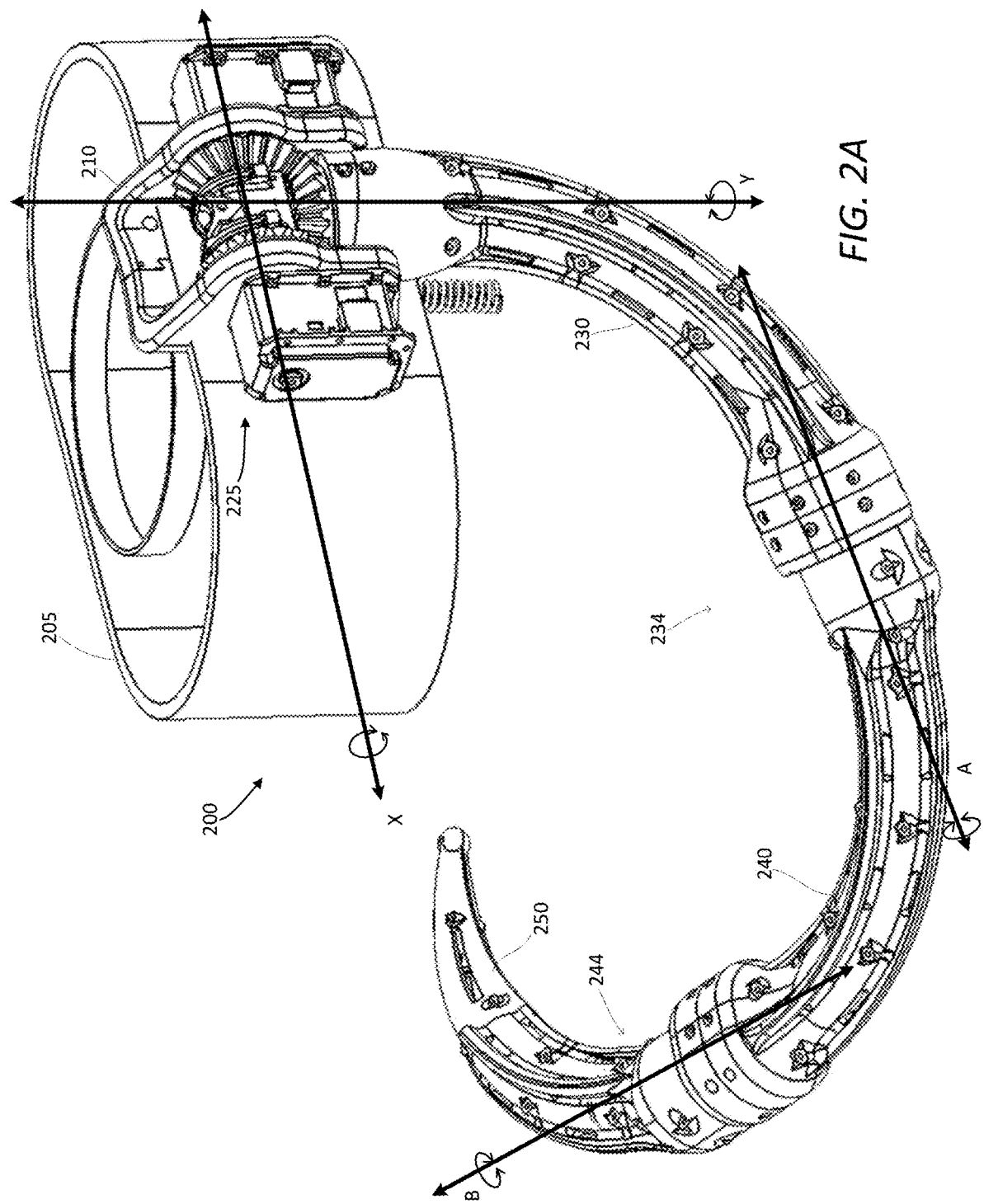
FIG. 2A shows a perspective view of a robotic manipulator according to some implementations.
Figure 2B:
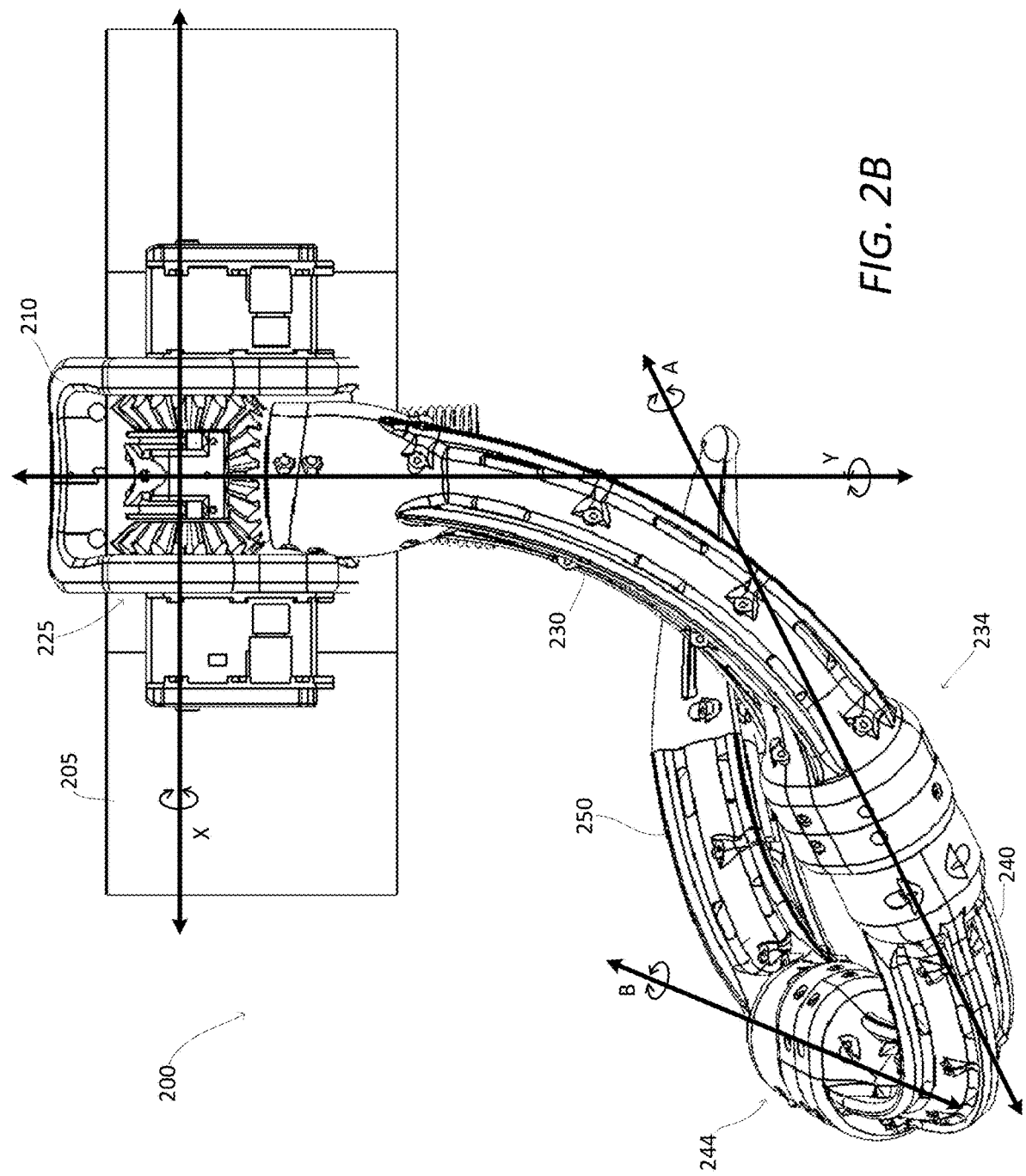
FIG. 2B shows a front view of a robotic manipulator according to some implementations.
Figure 2D:
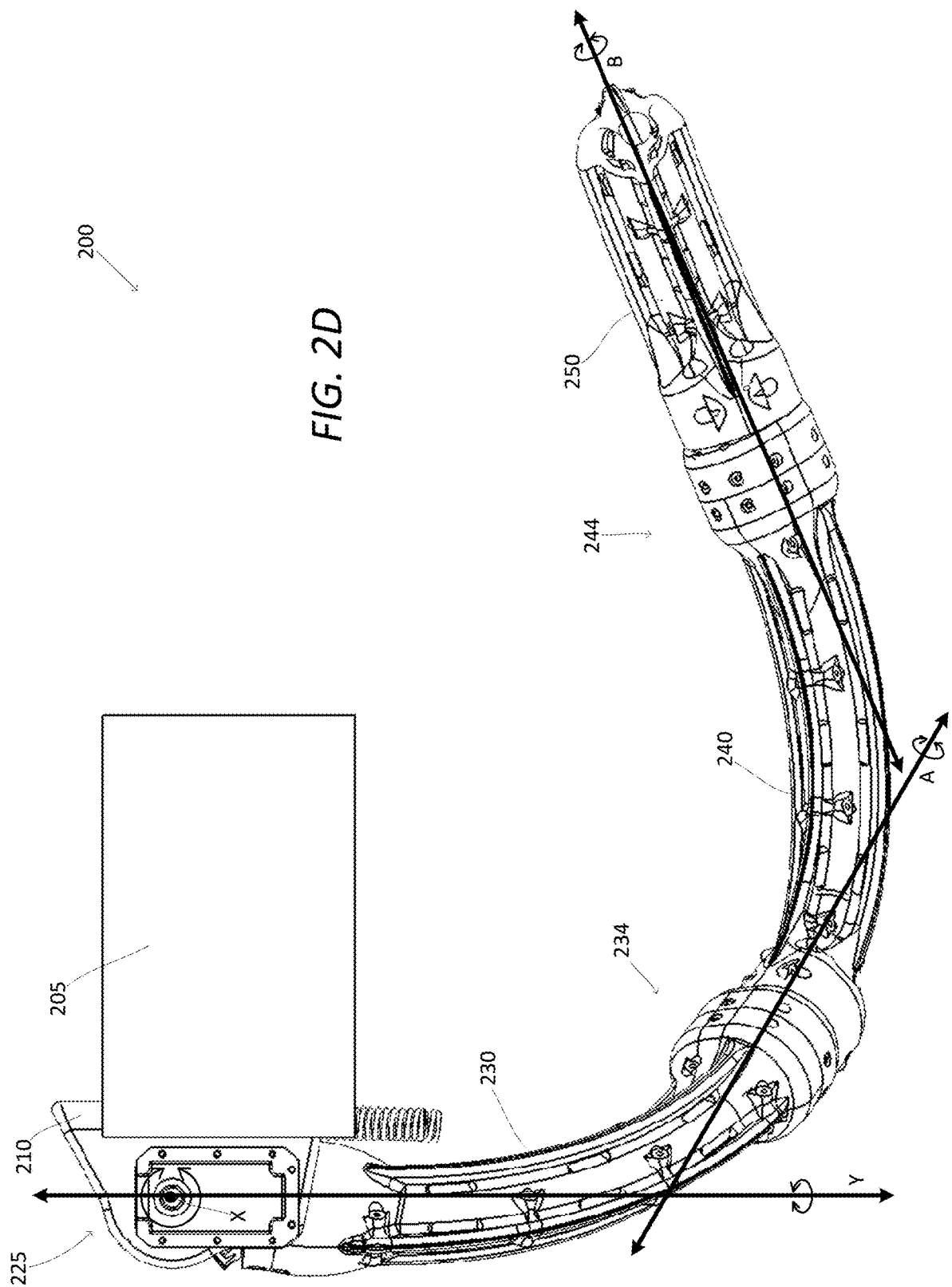
FIG. 2D shows a side view of a robotic manipulator according to some implementations.
Figure 2E:
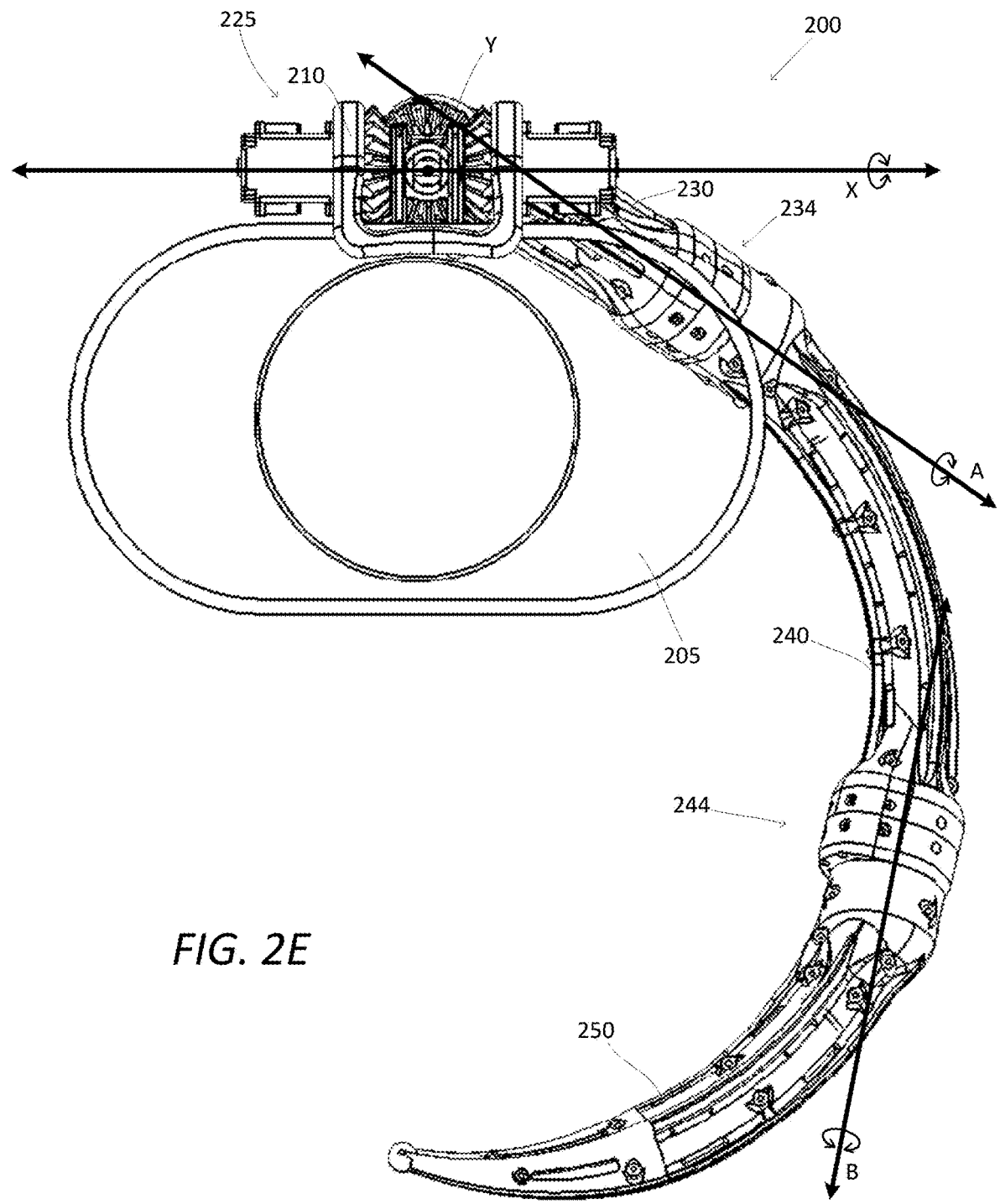
FIG. 2E shows a top view of a robotic manipulator according to some implementations.
Figure 2F:
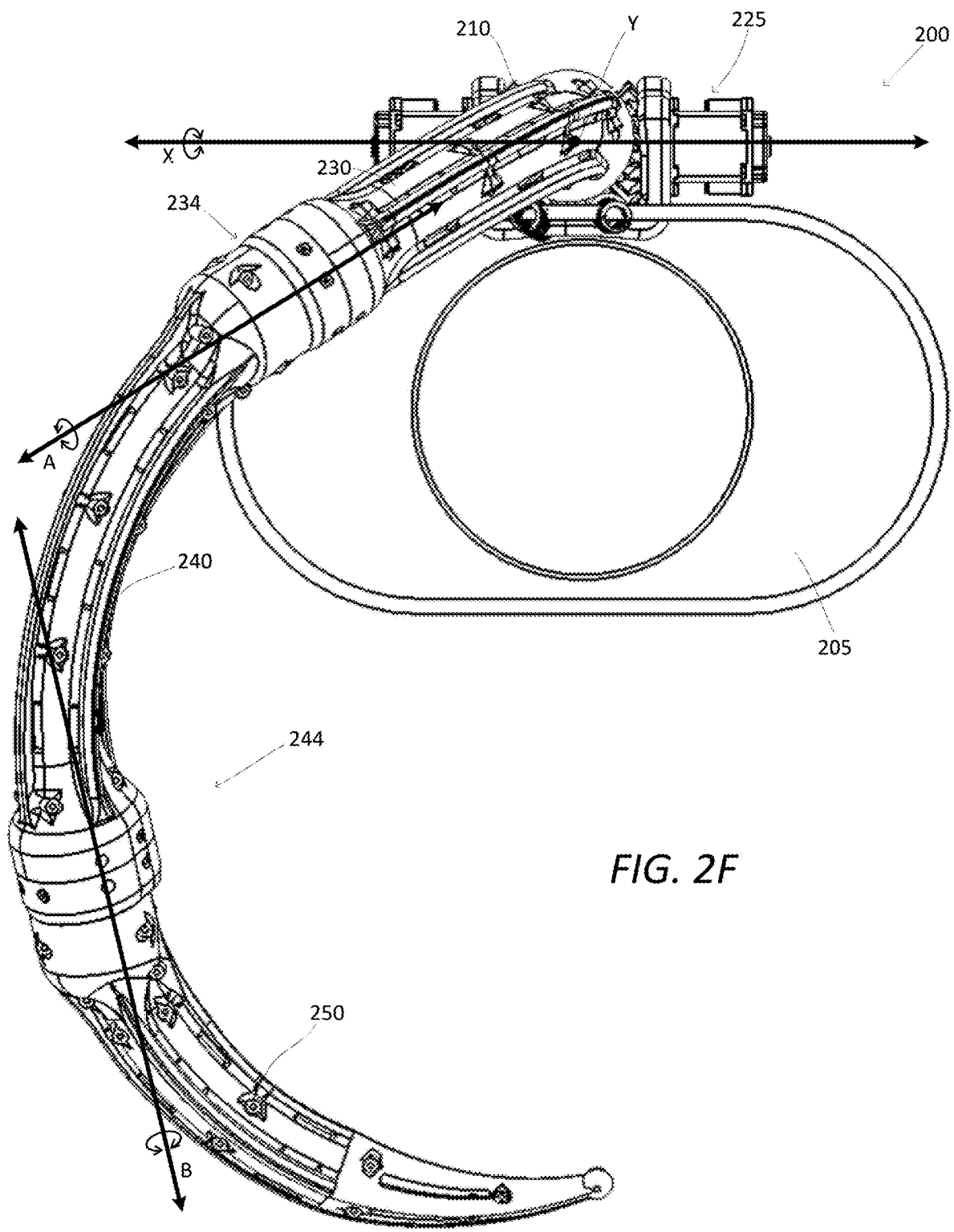
FIG. 2F shows a bottom view of a robotic manipulator according to some implementations.

FIG. 2A shows a perspective view of a robotic manipulator 200 according to some implementations. FIG. 2B shows a front view of the robotic manipulator 200 according to some implementations. FIG. 2C shows a back view of the robotic manipulator 200 according to some implementations. FIG. 2D shows a side view of the robotic manipulator 200 according to some implementations. FIG. 2E shows a top view of the robotic manipulator 200 according to some implementations. FIG. 2F shows a bottom view of the robotic manipulator 200 according to some implementations. Referring to FIGS. 1A-2F, the robotic manipulator 200 illustrates a non-limiting implementation of the robotic manipulators 100a and 100b.

As shown, the robotic manipulator 200 may include a base 210 that supports the rest of the robotic manipulator 200, including at least a first joint 225, a first segment 230, a mounting boss 234, a second segment 240, a mounting boss 244, and an end segment 250. The base 210, the first joint 225, the first segment 230, the mounting boss 234, the second segment 240, the mounting boss 244, and the end segment 250 may be non-limiting implementations of any one or more of the base 110, 110b, the first any one or more of joint 125, the first segment 130, 130b, the mounting boss 134, 134b, the second segment 140, 140b, the mounting boss 184, and the end segment 190, respectively. Other examples may include more or fewer arm segments and joints.

The base 210 may operatively couple the rest of the robotic manipulator 200 to an attachment point or interface in the manner described. As described, the attachment point or interface may be the floor, a movable platform, a robotic base (e.g., a drone or robot), a human operator, and/or the like. As shown in the non-limiting example of FIGS. 2A-2F, the interface may be a wearable belt 205 that can be worn by a human operator around a waist. The base 210 may be fixed to the wearable belt 205 or configured to be attachable to or detachable from the wearable belt 205. Other types of interfaces such as, but not limited to, a wearable belt, backpack, saddle, seat, wheelchair, clothing, headwear, prosthetic limb, or the like can likewise link the robotic manipulator 200 with the human operator.

The base 210 may structurally support the first joint 225. The first joint 225 may link the base 210 with the first segment 230 as well as the rest of the robotic manipulator 200. The first joint 225 may rotate the first segment 230 about two axes of rotation relative to the base 210. As the base 210 may be fixed or attached to an interface (e.g., the wearable belt 205), the first joint 225 may rotate the first segment 230 in the two axes of rotation relative to the interface at the base 210. In other words, the first joint 225 may rotate the first segment 230 in the two axes of rotation relative to the human operator or robotic base at the base 210.

Illustrating with a non-limiting example, the first joint 225 may rotate the first segment 230 about an X-axis and a Y-axis. The X-axis may be a fixed axis relative to the base 210. As described herein, the first joint 225 may have at least one gear having a shaft extending along the X-axis. As shown, the Y-axis extends along a longitudinal dimension of a portion of the first segment 230 contacting or proximal to the first joint 225. A proximal end of the first segment 230 (e.g., an end that is coupled to the first joint 225) may have a cross section. The Y-axis may extend through a center or any suitable point on the cross section. The Y-axis may be perpendicular to the cross section. Thus, as the first segment 230 is being rotated about the X-axis, the Y-axis may change accordingly. That is, the Y-axis may rotate about the X-axis in a same direction and angular speed as those of the first segment 230.

In the non-limiting example shown, the first joint 225 may be a single joint capable of supporting the rotation about the two axes of rotation. Such designs are advantageous because they are lightweight and compact, thus providing a small profile when fixed/attached to a user or machine base. In other implementations, the first joint 225 may include any number of joints that support rotation about at least the two axes of rotation.

The mounting boss 234 may link the first segment 230 and the second segment 240 while providing for the movement (e.g., rotation) of one or more of the first segment 230 or the second segment 240 relative to one another. In some implementations, the mounting boss 234 may include a second joint (e.g., the second joint 135) configured to rotate the second segment 240 with respect to the first segment 230 about a single axis of rotation (e.g., an A-axis). In some implementations, the mounting boss 234 may include a second joint (e.g., the second joint 135) configured to rotate the first segment 230 with respect to the second segment 240 about a single axis of rotation (e.g., the A-axis).

A portion of the first segment 230 that contacts or otherwise engages the mounting boss 234, the second joint 135, and/or the second segment 240 may have a first cross-section. The mounting boss 234 may have a second cross-section. A portion of the second segment 240 that contacts or otherwise engages the mounting boss 234, the second joint 135 supported by the mounting boss 234, and/or the first segment 230 may have a third cross-section. The A-axis may extend through a center or any suitable point on one or more of the first cross section, the second cross section, or the third cross section. The A-axis may be perpendicular to one or more of the first cross section, the second cross section, or the third cross section.

In other words, according to various implementations, the first segment 230 and the second segment 240 do not form a pivot about the mounting boss 234, but rather rotate with respect to each other. Such a configuration can mitigate pinching of a part of the robotic manipulator 200 with any nearby objects such as a user's clothing, as caused by pivoting at the mounting boss 234 and reduces tangling of the segments. While in the non-limiting example, the mounting boss 234 includes a single joint configured to rotate first segment 230 and/or the second segment 240 about the A-axis, other examples of the mounting boss 234 may include a single joint that actuates movement in two or more axes of rotation (such as, but not limited to, the first joint 225) or multiple joints that actuate movement in two or more axes of rotation.

The mounting boss 244 may link the second segment 240 and the end segment 250 while providing for the movement (e.g., rotation) of one or more of the second segment 240 or the end segment 250 relative to one another. In some implementations, the mounting boss 244 may include a joint (e.g., the Nth joint 185) configured to rotate the end segment 250 with respect to the second segment 240 about a single axis of rotation (e.g., a B-axis). In some implementations, the mounting boss 234 may include a joint (e.g., the Nth joint 185) configured to rotate the second segment 240 with respect to the end segment 250 about a single axis of rotation (e.g., the B-axis).

A portion of the second segment 240 that contacts or otherwise engages the mounting boss 244, the joint supported by the mounting boss 244, and/or the end segment 250 may have a fourth cross-section. The mounting boss 244 may have a fifth cross-section. A portion of the end segment 250 that contacts or otherwise engages the mounting boss 244, the joint supported by the mounting boss 244, and/or the second segment 240 may have a sixth cross-section. The B-axis may extend through a center or any suitable point on one or more of the fourth cross section, the fifth cross section, or the sixth cross section. The B-axis may be perpendicular to one or more of the fourth cross section, the fifth cross section, or the sixth cross section.

In other words, the second segment 240 and the end segment 250 do not form a pivot about the mounting boss 244, but rather rotate with respect to each other. As described, such configuration reduces pinching caused by pivoting at the mounting boss 244 and reduces tangling of the segments. While in the non-limiting example, the mounting boss 244 includes a single joint configured to rotate second segment 240 and/or the end segment 250 about the B-axis, other examples of the mounting boss 244 may include a single joint that actuates movement in two or more axes of rotation (such as, but not limited to, the first joint 225) or multiple joints that actuate movement in two or more axes of rotation.

The segments 230, 240, and 250 may be made from rigid or generally rigid material such as plastic, wood, metal, metal alloy, composite, and/or the like. The rigidity provides structural integrity for the robotic manipulator 200. The rigidity of the segments 230, 240, and 250 further allow accurate computation of the position of any part of the robotic manipulator 200, given that the shapes of the segments are fixed and thus represented by predetermined, fixed values in calculation. In other implementations, one or more of the segments 230, 240, and 250 may be made from a relatively flexible material formed from plastic, rubber, aluminum, and/or the like.

As shown, the end segment 250 may be a foot for locomotion. In some implementations, the end segment 250 may further include structures and/or devices configured for other functions, such as, but not limited to, object engagement (e.g., picking up an object, manipulating an object, etc.), data gathering, propulsion other suitable purposes.

As shown, each of the segments 230, 240, and 250 may have a hollow, rigid, cylindrical, and curved structure. One or more of the segments 230, 240, and 250 may have an internal volume for passing or otherwise air, wires, and support elements. The segments 230, 240, and 250 shown (e.g., in FIGS. 2A-2F) are non-limiting examples of the first segment 130, the second segment 140, and the end segment 190, respectively. Generally, the implementation of each of the first segment 130, the second segment 140, . . . , and the end segment 190 may exhibit one or more the properties described herein, including but not limited to, the hollow structure, the rigid structure, the cylindrical shape, the curved shape, or the like.

In some implementations, one or more of the first segment 130, second segment 140, . . . , and end segment 190 may have a hollow structure. In some implementations, one or more of the first segment 130, second segment 140, . . . , and end segment 190 may have a rigid structure. In some implementations, one or more of the first segment 130, second segment 140, . . . , and end segment 190 may have a cylindrical structure. In some implementations, one or more of the first segment 130, second segment 140, . . . , and end segment 190 may have a curved structure.

In some arrangements, each of one or more of the segments 230, 240, and 250 may include one or more commutators (e.g., the commutators 131, 141, or the like) for managing the wires. The combination of the commutators (e.g., 131 and 141), the shapes of the segments (e.g., 230, 240, and 250), and the configurations of the joints (e.g., 225) and mounting bosses (e.g., 234 and 244), or the like in the manner described herein allow the robotic manipulator 200 to rotate continuously at joints and mounting bosses, thus reducing torque needed to move the robotic manipulator 200 and to engage an object without entangling or harming the wires that provide power and control signals throughout the robotic manipulator 200.

In one non-limiting example, the first joint 225 may rotate the first segment 230 about two axes of rotation while each of the subsequent mounting bosses 234, 244 or joints supported therein may rotate one segment with respect to another segment in one axis of rotation. In some cases, it can be beneficial to provide the subsequent mounting bosses 234, 244 or joints supported therein (other than the joint 225 connecting the first segment 230 to the base 210) with one axis of rotation instead of two or more axes of rotation to reduce the torque needed to move about the subsequent mounting bosses 234, 244 or joints supported therein. The number of actuators (e.g., the motor 146, Nth motor 186, or the like) driving the subsequent mounting bosses 234, 244 or joints supported therein can be reduced given that only one axis of rotation is provided. For instance, one motor (e.g., the second motor 136) may be needed to drive a joint (e.g., the second joint 135 of the mounting boss 134, 234) to rotate one of the first segment 130, 230 or second segment 140, 240 with respect to another one of the first segment 130, 230 or second segment 140, 240 about a single axis of rotation. This leads to a reduction in weight and profile of the robotic manipulator 200, as well as the torque needed to move about the subsequent mounting bosses 234, 244 or joints supported therein.

Figure 3A:
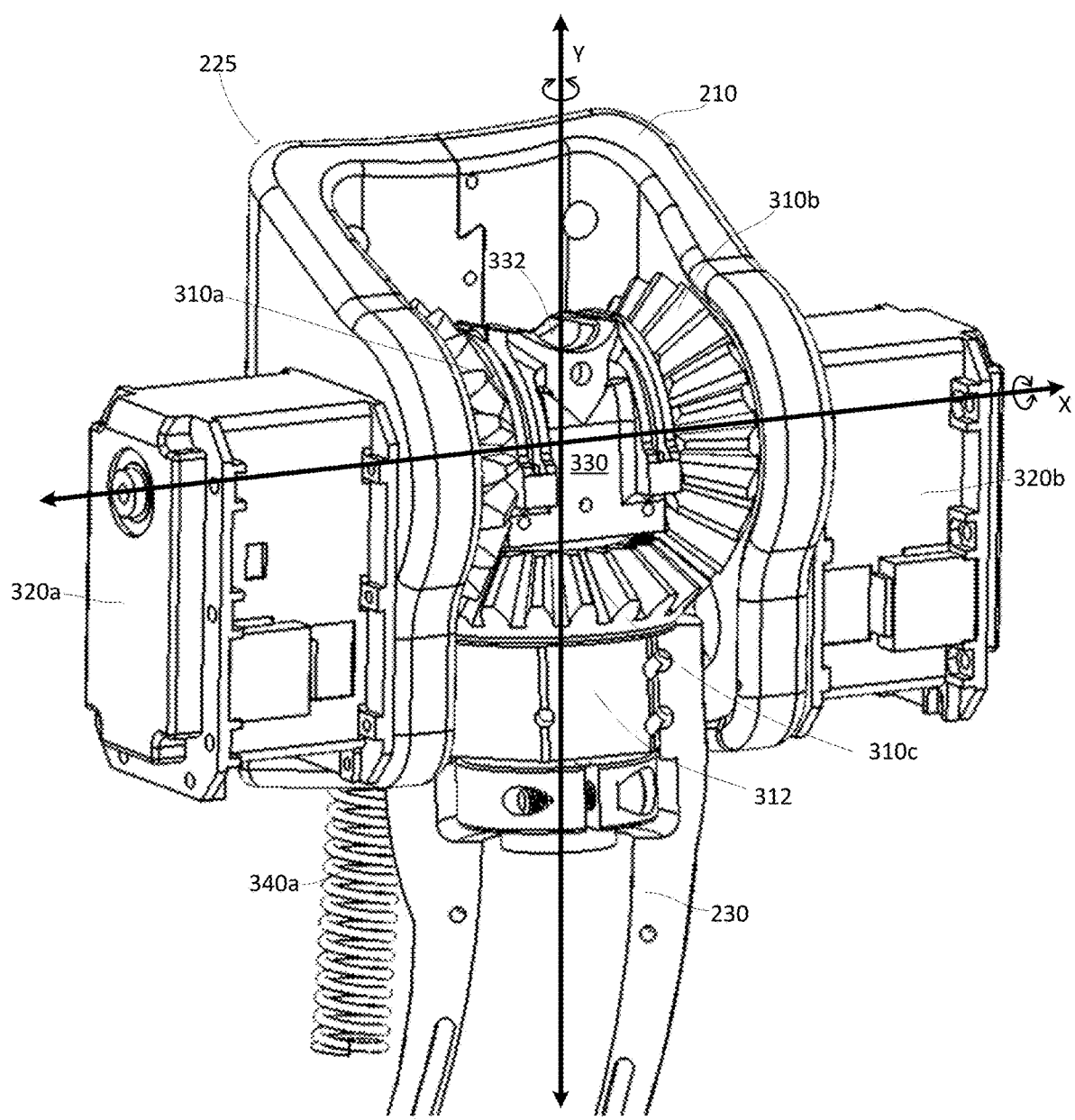
FIG. 3A shows a perspective view of the first joint (FIGS. 2A-2F) supported by the base (FIGS. 2A-2F) according to some implementations.
Figure 3B:
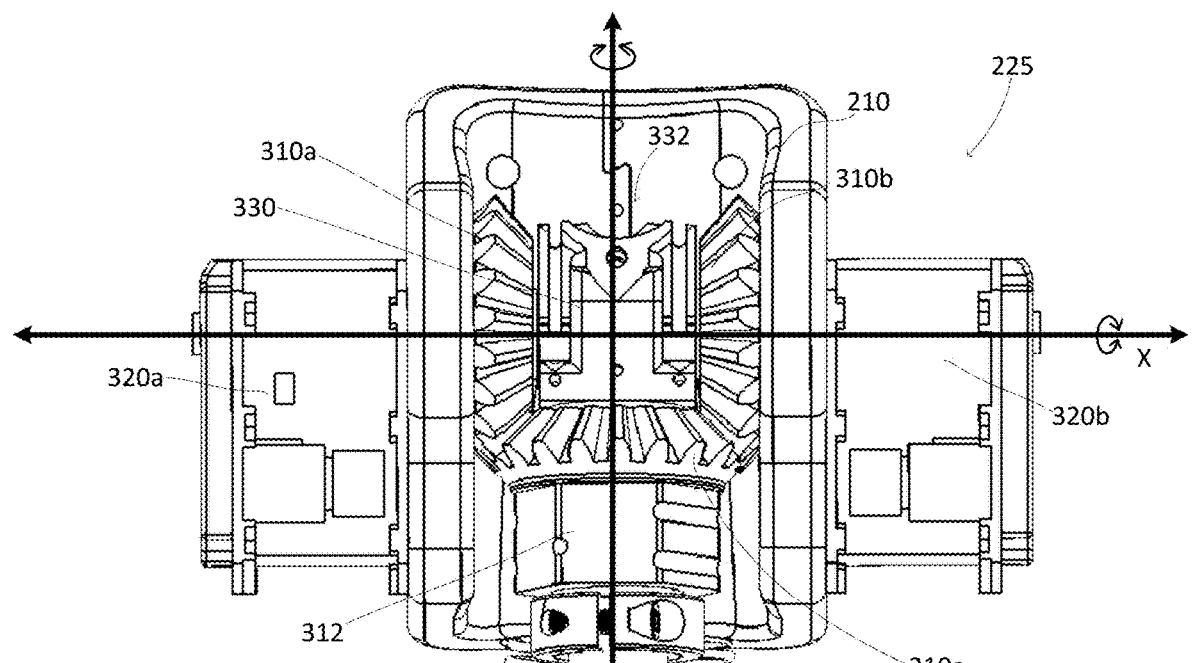
FIG. 3B shows a front view of the first joint (FIGS. 2A-2F) supported by the base (FIGS. 2A-2F) according to some implementations.
Figure 3C:
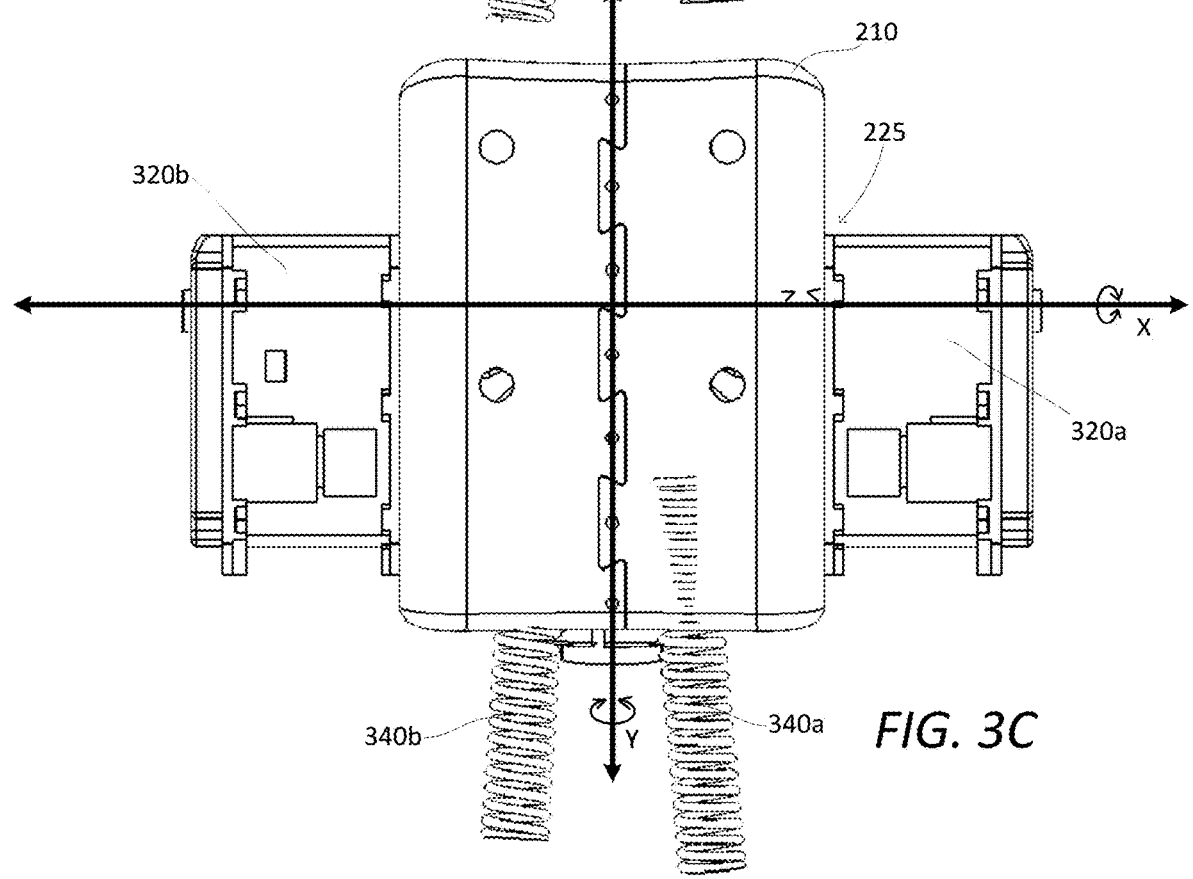
FIG. 3C shows a back view of the first joint (FIGS. 2A-2F) supported by the base (FIGS. 2A-2F) according to some implementations.
Figure 3D:
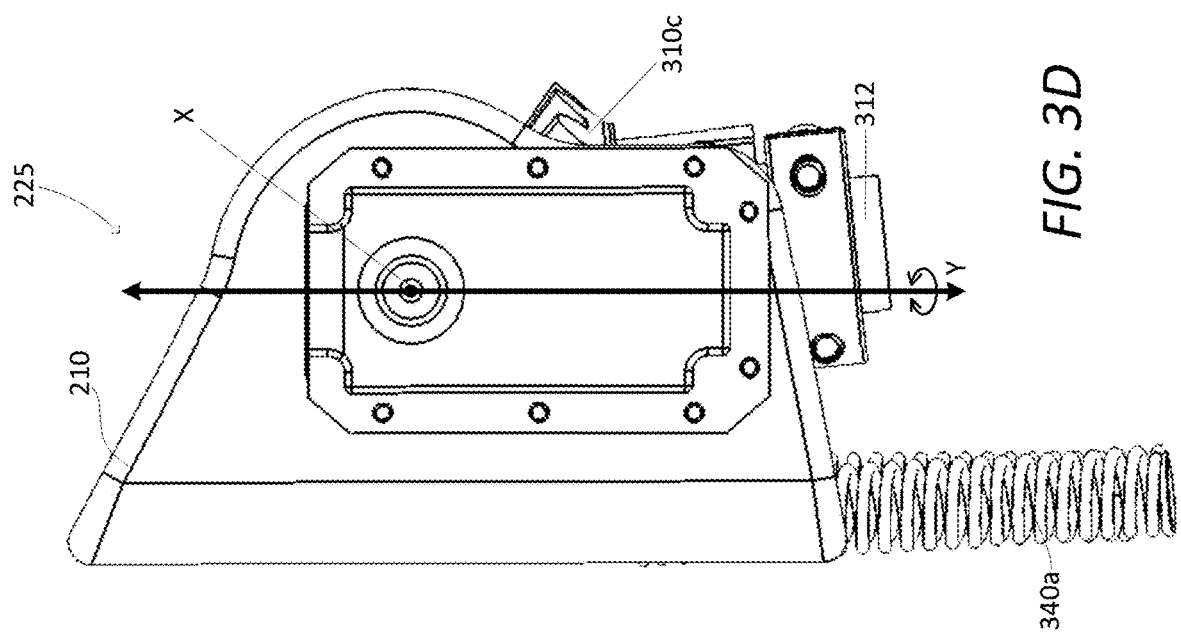
FIG. 3D shows a side view of the first joint (FIGS. 2A-2F) supported by the base (FIGS. 2A-2F) according to some implementations.
Figure 3E:
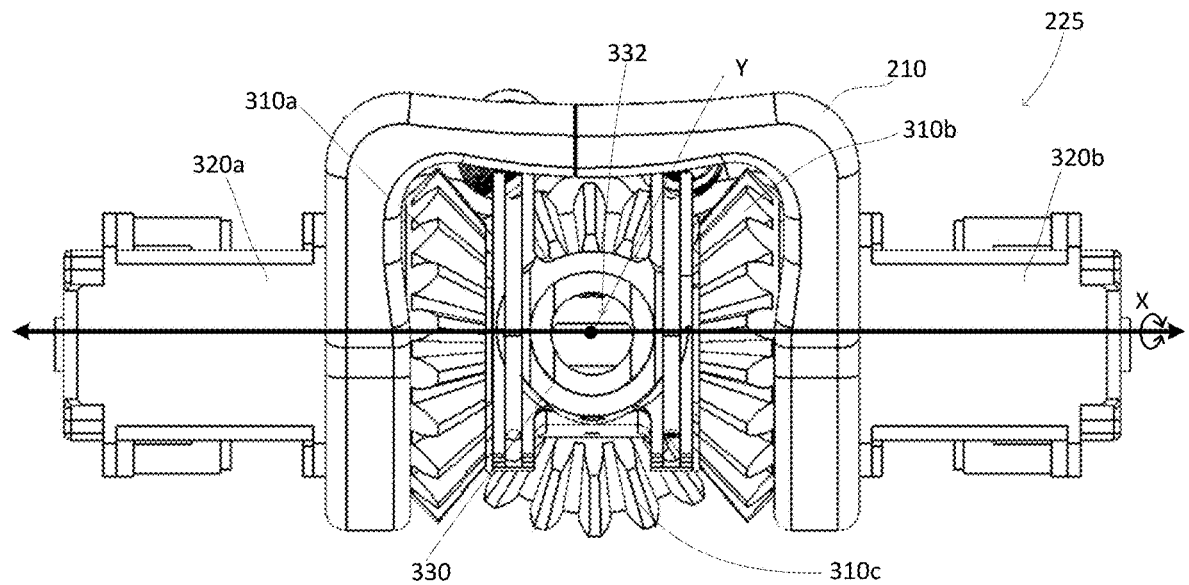
FIG. 3E shows a top view of the first joint (FIGS. 2A-2F) supported by the base (FIGS. 2A-2F) according to some implementations.
Figure 3F:
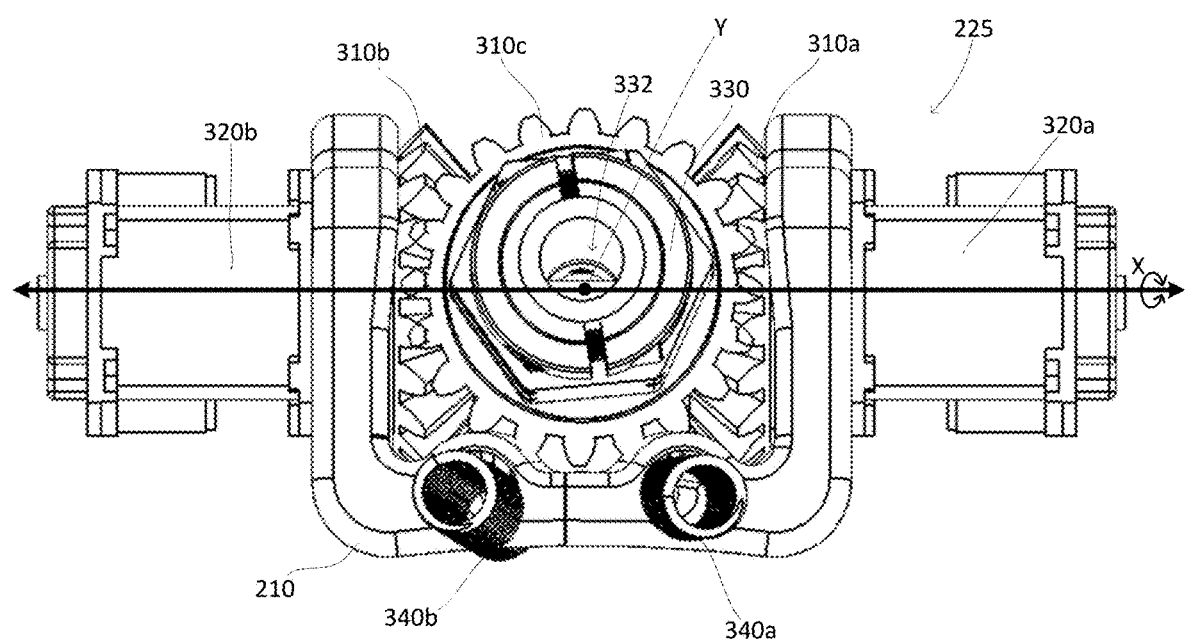
FIG. 3F shows a bottom view of the first joint (FIGS. 2A-2F) supported by the base (FIGS. 2A-2F) according to some implementations.

FIG. 3A shows a perspective view of the first joint 225 (FIGS. 2A-2F) supported by the base 210 (FIGS. 2A-2F) according to some examples. FIG. 3B shows a front view of the first joint 225 (FIGS. 2A-2F) supported by the base 210 (FIGS. 2A-2F) according to some examples. FIG. 3C shows a back view of the first joint 225 (FIGS. 2A-2F) supported by the base 210 (FIGS. 2A-2F) according to some examples. FIG. 3D shows a side view of the first joint 225 (FIGS. 2A-2F) supported by the base 210 (FIGS. 2A-2F) according to some examples. FIG. 3E shows a top view of the first joint 225 (FIGS. 2A-2F) supported by the base 210 (FIGS. 2A-2F) according to some examples. FIG. 3F shows a bottom view of the first joint 225 (FIGS. 2A-2F) supported by the base 210 (FIGS. 2A-2F) according to some examples.

Referring to FIGS. 1A-3F, the first joint 225 illustrates a non-limiting implementation of the first joint 125 of the robotic manipulator 100a. As shown, the base 210 may structurally support the first joint 225, including at least gears 310a-310c, mount 330, motors 320a and 320b, and springs 340a and 340b. The motors 320a and 320b may be non-limiting implementations of the first motor 126.

As described, the first joint 225 may be a two-axis joint that causes the first segment 230 to rotate about two axes of rotation (the X-axis and the Y-axis) relative to the base 210. As shown, the first joint 225 can be implemented with the gears 310a-310c meshed together, forming a 3-gear differential to enable said rotation. Each of the gears 310a-310c may be a bevel gear. Rotation of the gears 310a and 310b may translate into rotation of the gear 310c, which may in turn translate into movement (about the two axes of rotation) of first segment 230.

As shown, tooth-bearing faces of the gears 310a and 310b may be arranged to face each other. The shafts of the gears 310a and 310b may be coaxial and lie along the X-axis. In other words, each of the gears 310a and 310b may rotate about the X-axis. The gears 310a and 310b may be driven by at least one actuator. For example, the gears 310a and 310b may be driven by the motors 320a and 320b, respectively. Each of the motors 320a and 320b may be a multi-turn rotational servo. In some implementations, the gears 310a and 310b may have a same size. The gears 310a and 310b may be meshed with the gear 310c on opposite sides of the gear 310c.

The gear 310c may be coupled to the first segment 230 through a securing member 312. The securing member 312 may be fixed to the gear 310c and move (e.g., rotate) with the gear 310c. The securing member 312 may also be fixed to the proximal end of the first segment 230. Thus, movement of the gears 310a and 310b may translate into movement of the gear 310c and the securing member 312. The movement (e.g., rotation) of the gear 310c and the securing member 312 corresponds to the movement (e.g., rotation) of the first segment 230.

For instance, as the motors 320a and 320b rotate the gears 310a and 310b in a same direction (about the X-axis) at a same angular speed, the first segment 230 may be caused to rotate in the same direction (about the X-axis) at the same angular speed. As the gears 310a and 310b rotate in a same direction (about the X-axis) at a same angular speed, the gear 310c may not rotate about a shaft, which may lie on the Y-axis.

As the motors 320a and 320b rotate the gears 310a and 310b in different directions (about the X-axis) and/or at different angular speeds, the first segment 230 may be caused to rotate about the Y-axis in addition to or as an alternative to rotating about the X-axis. As the gears 310a and 310b rotate in different directions and/or at different angular speeds, the gear 310c may rotate about a shaft.

Therefore, controlling the rotation of the gears 310a and 310b can allow the first segment 230 to rotate about the X-axis, the Y-axis, or both simultaneously. As such, the first segment 230 can be rotated about the two axes of rotation.

As shown, the mount 330 may be arranged between the gears 310a-310c. Thus, the gear-facing surfaces of the gears 310a-310c face the mount 330. The shafts of the gears 310a and 310b may extend along the X-axis through the mount 330, which may rotatably support the gears 310a and 310b. The mount 330 may not move with the gears 310a and 310b. The mount 330 may rotatably support the gear 310c. The mount 330 may rotate about the X-axis with the gear 310c, the securing member 312, and the first segment 230. In the non-limiting example shown, the mount 330 may not rotate with the gear 310c about the Y-axis in some implementations.

For wire management and structural support, the mount 330 may include at least one hole (e.g., a hollow bore 332) through which wires and support structure (e.g., beams) can be passed or installed. The wires may carry command signals from the processing circuit 102 and/or power from the power supply 108. The hollow bore 332 may extend through to join holes (not shown) in the gear 310c and the securing member 312. The wires connecting the processing circuit 102 and/or power from the power supply 108 may be passed through the hollow bore 332 as well as the holes in the gear 310c and the securing member 312 to reach an internal volume defined by the structure of the first segment 230. As described, the first segment 230 (130) may have the commutator 131 for managing the wires while the first segment 230 is being rotated about the two axes of rotation.

In the example shown, the springs 340a and 340b may be an example implementation of the support element 122. As described in detail herein, the springs 340a and 340b may provide passive mechanical force in addition to the active force provided by the motors 320a and 320b to rotate the mount 330, the gear 310c, the securing member 312, the first segment 230, and any part of the robotic manipulator 200 linked to the first segment 230 above the X-axis.

The three-gear differential (e.g., the gears 310a-310c) may be an implementation of the first joint 125 that rotates the first segment 130 in the two axes of rotation. The three-gear differential may be reliable, compact, and light, thus improving the profile of the robotic manipulator 200. The addition of any passive support element 122 can further improve the profile due to light and compact nature (as compared to active support elements). To facilitate assembly of the first joint 125 (225), the base 210 may have a dovetail assembly design. The two parts of the dovetail design may be aligned and assembled as the gears 310a-310c are meshed together. When aligned and assembled, a backside of the dovetail assembly of the base 210 may form a curvature that curves toward the first joint 225, to conserve space. Therefore, the dovetail assembly design can further improve the profile of the robotic manipulator 200.

Figure 4A:
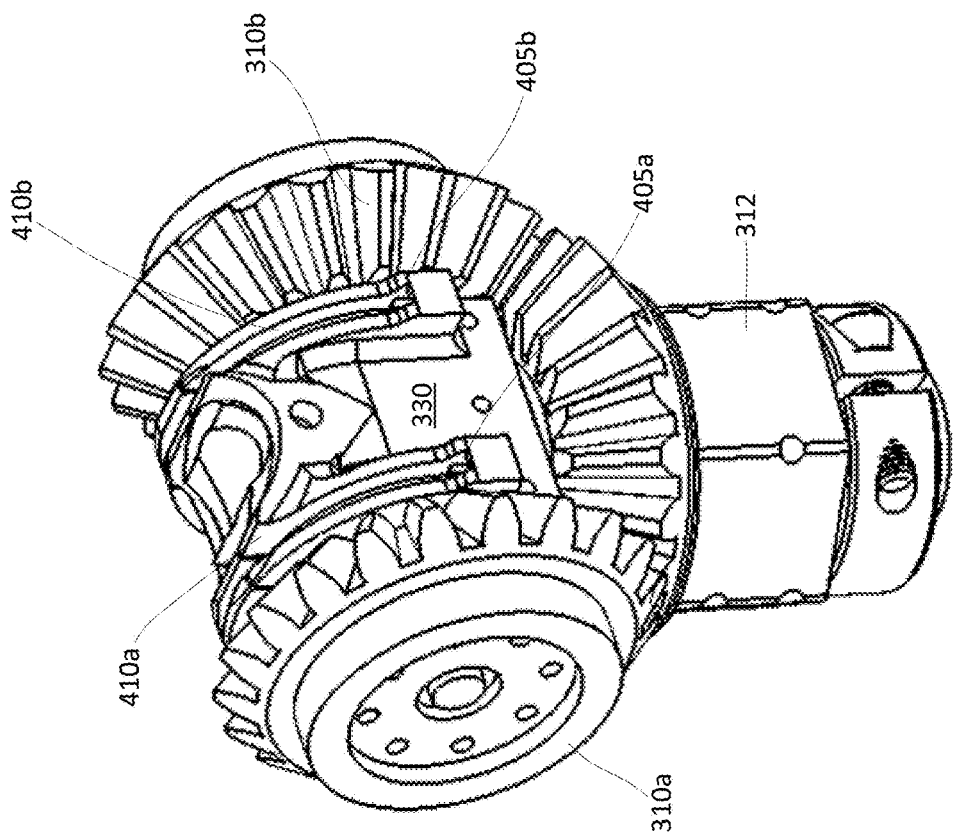
FIG. 4A shows a perspective view of the mount (FIGS. 3A-3F) according to some implementations.
Figure 4C:
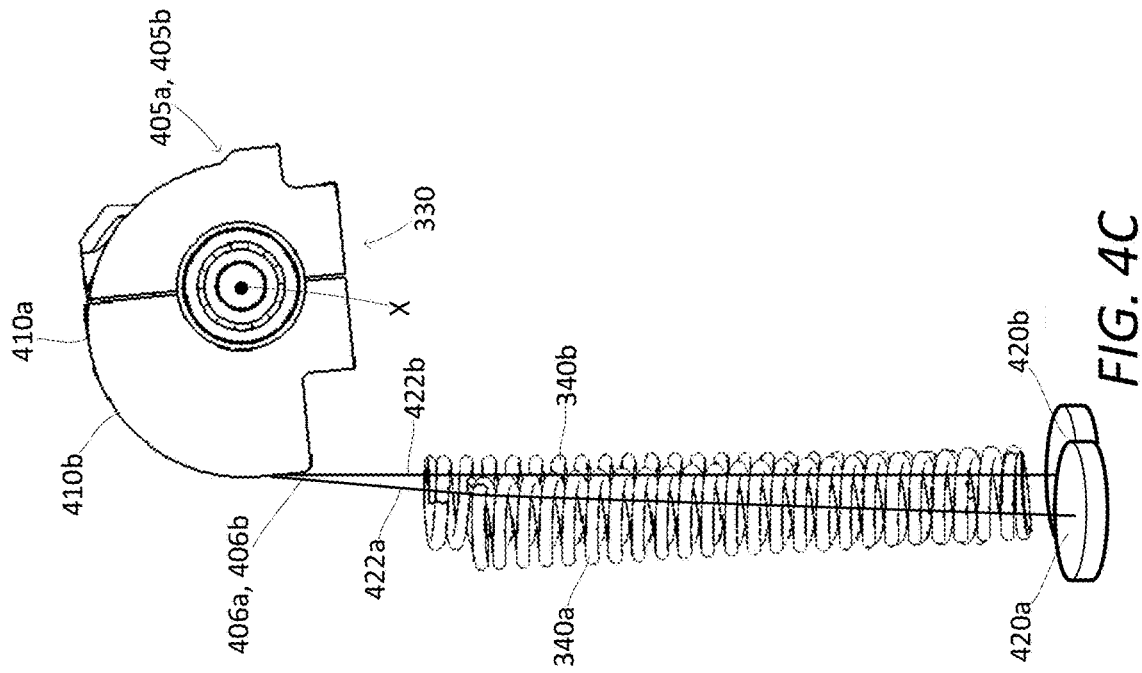
FIG. 4C shows a side view of a spring-loaded passive support feature of the mount (FIGS. 3A-3F) according to some implementations.
Figure 4B:
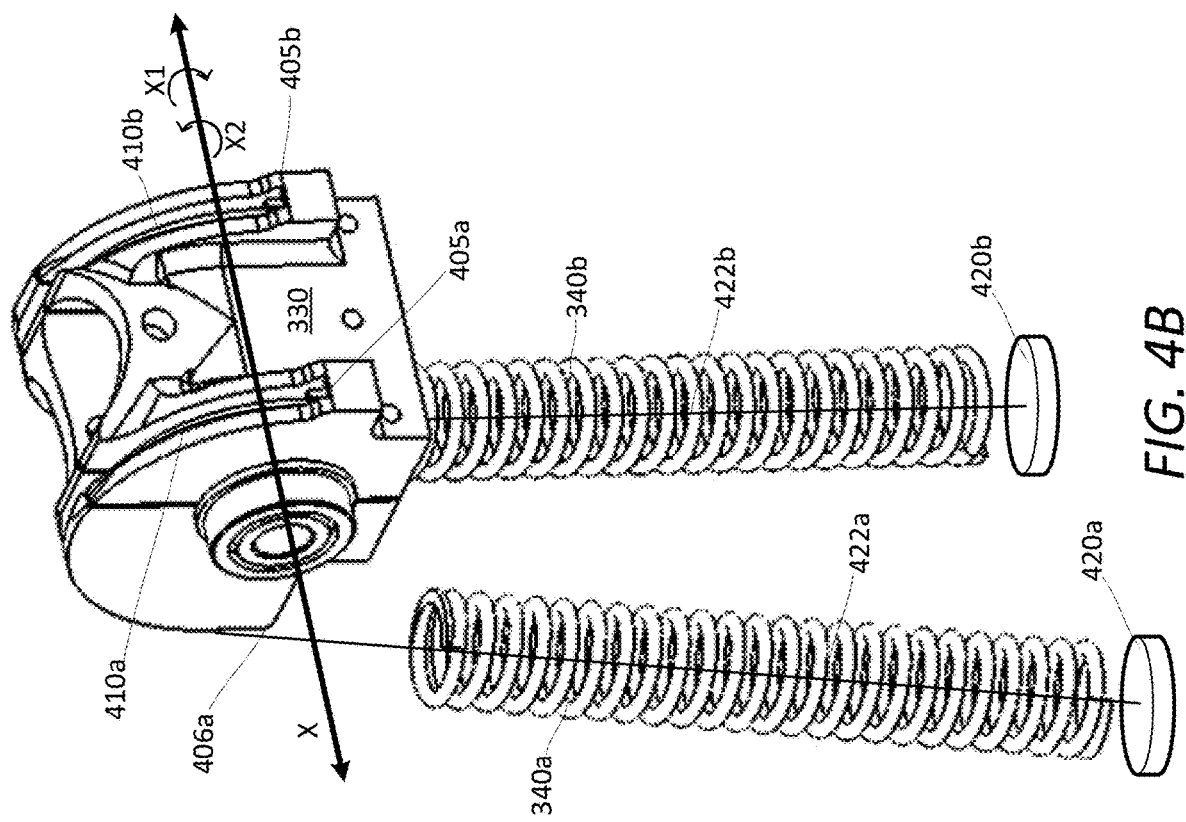
FIG. 4B shows perspective view of a spring-loaded passive support feature of the mount (FIGS. 3A-3F) according to some implementations.

FIG. 4A shows a perspective view of the mount 330 (FIGS. 3A-3F) according to some implementations. FIG. 4B shows perspective view of a spring-loaded passive support feature of the mount 330 (FIGS. 3A-3F) according to some examples. FIG. 4C shows a side view of a spring-loaded passive support feature of the mount 330 (FIGS. 3A-3F) according to some examples. Referring to FIGS. 1-4C, the first joint 125 (e.g., the first joint 225) may include the support element 122 for moving the first segment 130 (e.g., the first segment 230). As shown, the support element 122 may be implemented with the springs 340a and 340b, which may be passive (e.g., elastic) elements.

Responsive to the springs 340a and 340b being compressed or extended, the springs 340a and 340b may create a reactionary force (e.g., an elastic force) opposite to a direction of motion of the first segment 230. In the non-limiting example shown, each the springs 340a and 340b may be coupled to a progressive eccentric lobe 410a or 410b on the mount 330. The progressive eccentric lobe 410a or 410b may have a shorter radius at anchor 405a or 405b, respectively, as compared to that at end point 406a or 406b, respectively. Thus, the radius of the progressive eccentric lobe 410a or 410b may progressively increase from the anchor 405a or 405b to the end point 406a or 406b.

One end of a string 422a may be fixed to the anchor 405a of the progressive eccentric lobe 410a while another end of the string 422a may extend through the spring 340a to be fixed to a stopper 420a. One end of a string 422b may be fixed to the anchor 405b of the progressive eccentric lobe 410b while another end of the string 422b may extend through the spring 340b to be fixed to a stopper 420b. The progressive eccentric lobes 410a and 410b may have grooves, channels, bores, or the like for holding the strings 422a and 422b, respectively. Each spring 340a or 340b may have end (opposite to the end coupled to the stopper 420a or 420b) that may be fixed to a part of the base 210 (not shown).

Such structure enables the springs 340a and 340b to compress as the mount 330 and the first segment 230 rotate about the X-axis (e.g., in X1 direction) to create elastic potential energy in the opposite direction (e.g., in X2 direction). Responsive to the mount 330 and the first the opposite direction (e.g., in the X2 direction), the potential energy can be released as the springs 340a and 340b become uncompressed, thus providing addition force to the mount 330 and the first segment 230 in that direction (e.g., X2).

Therefore, the first joint 225 of the robotic manipulator 200 may include both the 3-gear differential driven by the motors 320a and 320b as well as the spring-loaded mechanisms to provide mechanical force to bias the first segment 230 in at least one rotational direction (e.g., the X2 direction) about one (e.g., the X-axis) of the two axes of the first joint 225.

While in the non-limiting example, two springs 340a and 340b are used to bias the first segment 230 in the X2 direction, other examples include one, or three or more springs, or other types of passive members (e.g., rubber grommets or the like) to bias the first segment 230 in any suitable direction.

Figure 5A:
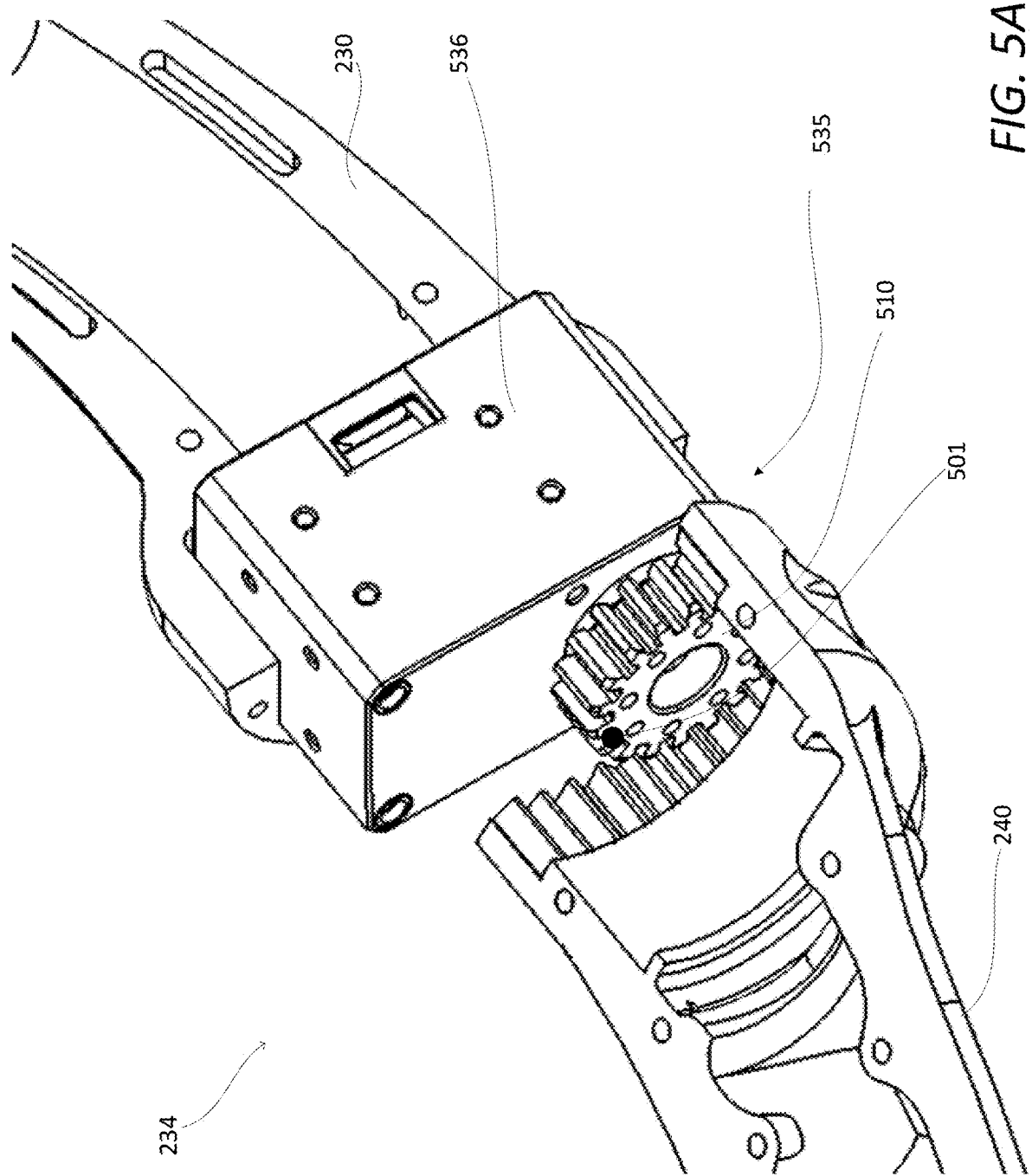
FIG. 5A shows a perspective view of the mounting boss (FIGS. 2A-2F) according to some implementations.
Figure 5B:
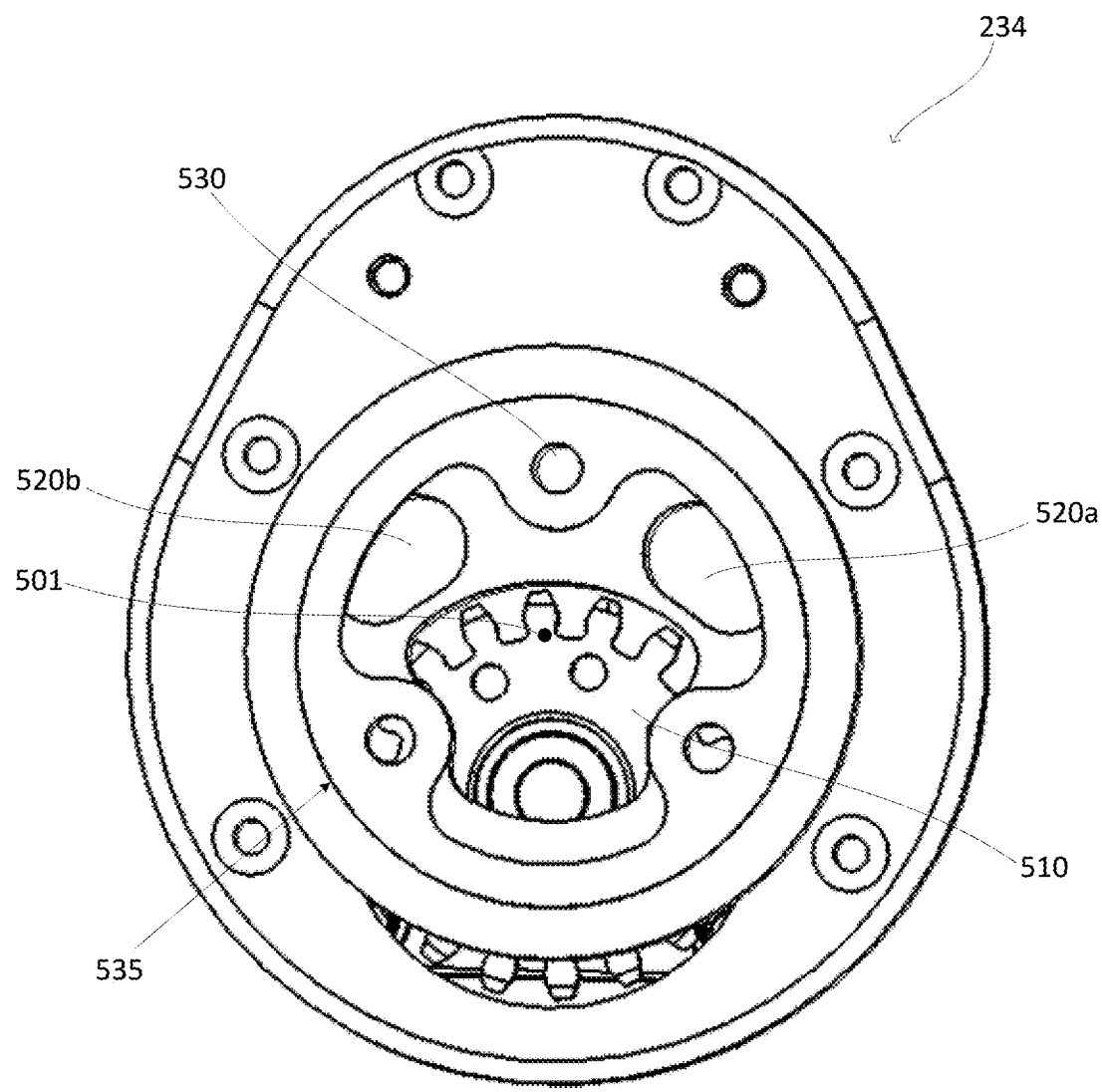
FIG. 5B shows cross-sectional view of the mounting boss (FIGS. 2A-2F) according to some implementations.

FIG. 5A shows a perspective view of the mounting boss 234 (FIGS. 2A-2F) according to some implementations. Some components of the mounting boss 234 (FIGS. 2A-2F) are not shown in FIG. 5A for clarity. FIG. 5B shows cross-sectional view of the mounting boss 234 (FIGS. 2A-2F) according to some examples. Referring to FIGS. 1-5B, while the non-limiting examples are described with respect to the mounting boss 234 between the first segment 230 and the second segment 240, similar implementations can be employed to any mounting boss/joint (e.g., the mounting boss 244) of the robotic manipulator 200 other than the first joint 225. As described, the mounting boss 234 may support rotation of the first segment 230 with respect to the second segment 240 about the A-axis, instead of pivoting at the mounting boss 234. The mounting boss 234 supports rotation of the first segment 230 and the second segment 240 with respect to each other, instead of any pivot actions.

The first segment 230 may be fixed or otherwise attached to a first end of the mounting boss 234. The second segment 240 may be fixed or otherwise attached to a second, opposite end of the mounting boss 234. The mounting boss 234 may include a second joint 535 actuated by a second motor 536. The second joint 535 may be a non-limiting implementation of the second joint 135. The second motor 536 may be a non-limiting implementation of the second motor 136. The second motor 536 may receive command signals and power from the processing circuit 102 and the power supply 108, respectively. The second motor 536 may drive the second joint 535 (including, but not limited to, gear 510), which may be mechanically coupled to the first segment 230 and the second segment 240, to rotate the first segment 230 or second segment 240 against one another, based on the command signals carried by at least one wire linked to the processing circuit 102. In some implementations, the second joint 535 may be a single-axis joint (rotatable about a single axis, such as the A-axis). The second motor 536 may be a multi-turn rotational servo.

As shown, the gear 510 may be mounted offset from a center 501 of a cross-section of the mounting boss 234. In some implementations, the gear 510 may be mounted offset from a center of a cross-section of the first segment 230 and/or of the second segment 240 to leave space (e.g., structural bore 530) for an arm connection structure and/or an opening (e.g., bores 520a and 520b) through which wires (carrying power and/or control signals) or air can be passed. That is, a center of the gear 510 may be offset from one or more of the center 501 of the cross-section of the mounting boss 234, the center of a cross-section of the first segment 230, and/or the center of the second segment 240. The structural bore 530 and the bores 520a and 520b may through a portion of the cross-section area that is not covered by the offset-mounted gear 510. Thus, the gear 510 may be mounted offset from the center 501, to leave space for the arm connection structure, the wires, and/or air to pass through the second joint 535. The gear 510 may nevertheless be able to engage cogs or teeth arranged around an internal surface of the first segment 230, the second segment 240, and/or the mounting boss 234 for the rotation.

Accordingly, in various implementations, the robotic manipulator 200 may have a joint (e.g., the second joint 135, 535, the Nth Joint 185, a joint supported by the mounting boss 244, and/or the like) supporting two adjacent segments (e.g., adjacent ones of the first segment 130, 230, the second segment 140, 240, the end joint 190, 250, and/or the like) for rotation about a single axis relative to one another, where such joint may have a motor (e.g., the motor 136, 536, 186, and/or the like) that drives a gear (e.g., the gear 510) that is mounted on the joint at a position offset from a center (e.g., the center 501) of a cross-section of one or more of the two adjacent segments.

Configurations similar to described with respect to the mounting boss 234 (the joint 535) may be implemented for the mounting boss 184, 244, and/or any additional mounting bosses linking adjacent segments.

While in the non-limiting examples show, the joints may be actuated by motors, other suitable mechanisms to actuate movement at the joints may be used, including but not limited to, hydraulics, pneumatic, electric, thermal, magnetic, mechanical, and/or the like. All joints described herein may be controlled by processing circuit 102 to move sequentially or simultaneously.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A robotic manipulator, comprising:
a base;
a first segment;
a first joint operatively coupling the base and the first segment, wherein the first joint comprises a 3-gear differential configured to rotate the first segment about at least two axes of rotation with respect to the base;
a second segment; and
a second joint operatively coupling the first segment and the second segment, wherein the second joint is configured to rotate the second segment about at least one axis of rotation with respect to the first segment;
wherein at least one of the first segment or the second segment has a curved shape.

2. The robotic manipulator of claim 1, wherein the at least one of the first segment or the second segment is rigid and curved along a length dimension.

3. The robotic manipulator of claim 2, wherein each of the first segment and the second segment is rigid and curved along a length dimension.

4. The robotic manipulator of claim 2, wherein the at least one of the first segment or the second segment comprises a hollow cylindrical structure that has the curved shape.

5. The robotic manipulator of claim 1, wherein:
the 3-gear differential comprises a first gear, a second gear, and a third gear; and
the first gear and the second gear have a same size.

6. The robotic manipulator of claim 5, wherein:
a tooth-bearing face of the first gear faces a tooth-bearing face of the second gear;
a shaft of the first gear and a shaft of the second gear are coaxial;
the third gear is operatively coupled to the first segment; and
the third gear has teeth meshed with teeth of the first gear and the second gear such that movement of the first gear and the second gear translates to movement of the first segment.

7. The robotic manipulator of claim 5, wherein:
the first gear and the second gear are driven by separate first motors; and
each of the separate first motors is a multi-turn rotational servo configured for continuous rotation.

8. The robotic manipulator of claim 5, wherein:
each of the first gear, the second gear, and the third gear is a bevel gear;
the first gear and the second gear rotating in a same direction with a same angular speed causes the first segment to rotate in the same direction with the same angular speed; and
the first gear and the second gear rotating in at least one of different directions or different angular speeds causes the first segment to rotate about a shaft of the third gear.

9. The robotic manipulator of claim 1, wherein the base further comprises a support element operatively coupled to the first joint, and wherein the support element is configured to provide a reactionary force opposite to a direction of motion of the first segment.

10. The robotic manipulator of claim 9, wherein the support element comprises a spring-loaded device to provide mechanical force to bias the first segment in one rotational direction about one of the at least two axes of rotation about the first joint.

11. The robotic manipulator of claim 9, wherein:
the support element comprises at least a spring operatively coupled to at least one progressive eccentric lobe fixed to a mount that rotates with the first segment in one of the at least two axes of rotation; and
the spring is configured to compress or extend in response to the motion of the first segment to store mechanical energy corresponding to the reactionary force.

12. The robotic manipulator of claim 1, wherein:
the second joint comprises a second motor configured to rotate the second segment about the at least one axis of rotation with respect to the first segment; and
the second motor is a multi-turn rotational servo.

13. The robotic manipulator of claim 12, wherein:
the second joint further comprises a hollow bore through which at least one wire is passed; and
the at least one wire is passed through the first segment.

14. The robotic manipulator of claim 13, wherein the second motor drives a gear that is offset from a center of a cross-section of the first segment, leaving space for at least one of an arm connection structure or an opening to pass wires through the second joint.

15. The robotic manipulator of claim 14, wherein the gear driven by the second motor engages teeth arranged on an internal surface of the second segment to rotate the second segment with respect to the first segment.

16. The robotic manipulator of claim 1, wherein the first joint and the second joint are continuous rotation joints.

17. The robotic manipulator of claim 1, wherein the base is configured to be operatively coupled to an attachment point or an interface.

18. The robotic manipulator of claim 1, wherein:
the first joint is supported by the base; and
the first joint comprises a hollow bore through which at least one wire is passed.

19. The robotic manipulator of claim 1, further comprising at least one additional segment linkage assembly, wherein:
each of the at least one additional segment linkage assembly comprises an additional segment linked to another segment of the robotic manipulator through an additional joint; and
the additional joint is configured to rotate the additional segment about at least one axis of rotation with respect to the another segment.

20. The robotic manipulator of claim 19, wherein the additional segment in each of the at least one additional segment linkage assembly has a curved shape.

21. The robotic manipulator of claim 1, further comprising a processing circuit configured to control rotation at the first joint and the second joint.

22. The robotic manipulator of claim 21, wherein the first joint and the second joint are driven by separate motors controlled by the processing circuit.

23. The robotic manipulator of claim 1, wherein:
one of the first segment or the second segment comprises a commutator;
the second joint comprises an offset mounted gear that is mounted at a position offset from a center of a cross-section of one or more of the first segment or the second segment; and
the offset mounted gear leaves space for at least one of an arm connection structure or an opening to pass at least one wire through the second joint.

24. The robotic manipulator of claim 23, wherein the space left by the offset mounted gear and the commutator are configured to prevent the at least one wire from entangling or damage as the first segment and the second segment rotate about an axis relative to one another.

25. A method of providing a robotic manipulator, the method comprising:
providing a base;
providing a first segment;
providing a first joint operatively coupling the base and the first segment, wherein the first joint comprises a 3-gear differential configured to rotate the first segment about at least two axes of rotation with respect to the base;
providing a second segment; and
providing a second joint operatively coupling the first segment and the second segment, wherein the second joint is configured to rotate the second segment about at least one axis of rotation with respect to the first segment;
wherein at least one of the first segment or the second segment has a curved shape.

26. A robotic manipulator, comprising:
a base means;
a first segment means;
a first joint means operatively coupling the base means and the first segment means, wherein the first joint means comprises a 3-gear differential configured to rotate the first segment means about at least two axes of rotation with respect to the base means;
a second segment means; and
a second joint means operatively coupling the first segment means and the second segment means, wherein the second joint means is configured to rotate the second segment means about at least one axis of rotation with respect to the first segment means;
wherein at least one of the first segment means or the second segment means has a curved shape.

* * * * *